US012272288B2

(12) United States Patent
Hong et al.

(10) Patent No.: US 12,272,288 B2
(45) Date of Patent: Apr. 8, 2025

(54) DISPLAY DEVICE

(71) Applicant: Samsung Display Co., Ltd., Yongin-si (KR)

(72) Inventors: Sung Chul Hong, Yongin-si (KR); Do Yeong Park, Yongin-si (KR); Ki Hyun Pyo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/487,008

(22) Filed: Oct. 13, 2023

(65) Prior Publication Data

US 2024/0203315 A1 Jun. 20, 2024

(30) Foreign Application Priority Data

Dec. 16, 2022 (KR) ........................ 10-2022-0177117

(51) Int. Cl.
*G09G 3/20* (2006.01)

(52) U.S. Cl.
CPC ... *G09G 3/2074* (2013.01); *G09G 2300/0439* (2013.01)

(58) Field of Classification Search
CPC ..................... G09G 3/2074; G09G 2300/0439
See application file for complete search history.

(56) References Cited

U.S. PATENT DOCUMENTS

| | | | | |
|---|---|---|---|---|
| 10,249,603 | B2 | 4/2019 | Cho et al. | |
| 2007/0236424 | A1* | 10/2007 | Kimura | H01L 27/1214 345/76 |
| 2017/0358563 | A1* | 12/2017 | Cho | H01L 25/167 |
| 2020/0202803 | A1* | 6/2020 | Lin | G09G 3/3648 |
| 2020/0343312 | A1* | 10/2020 | Ryu | H10K 59/40 |
| 2022/0208936 | A1 | 6/2022 | Kim | |
| 2024/0144850 | A1* | 5/2024 | Yoshiga | G09G 3/2003 |

FOREIGN PATENT DOCUMENTS

| | | | |
|---|---|---|---|
| KR | 10-1987196 | B1 | 6/2019 |
| KR | 10-2022-0097714 | A | 7/2022 |

* cited by examiner

*Primary Examiner* — Ryan A Lubit
(74) *Attorney, Agent, or Firm* — Womble Bond Dickinson (US) LLP

(57) ABSTRACT

A display device includes: a base layer; a pixel circuit layer on the base layer, the pixel circuit layer including lower lines, the pixel circuit layer having a line-free area in which the lower lines are not present; and a light-emitting-element layer on the pixel circuit layer, the light-emitting-element layer including electrodes and a light emitting element on the electrodes, the light-emitting-element layer having an electrode-free area in which the electrodes are not present. The line-free area overlaps the electrode-free area in a plan view.

18 Claims, 19 Drawing Sheets

ME: ME1, ME2, ME3
CST: CST1, CST2, CST3

DISPLAY DEVICE

CROSS-REFERENCE TO RELATED APPLICATION

This application claims priority to and the benefit of Korean Patent Application No. 10-2022-0177117, filed on Dec. 16, 2022, in the Korean Intellectual Property Office, the entire disclosure of which is incorporated herein by reference.

BACKGROUND

1. Field

Aspects of embodiments of the present disclosure generally relate to a display device.

2. Description of Related Art

Recently, as interest in information displays is increased, research and development of display devices have been continuously conducted.

SUMMARY

Embodiments of the present disclosure provide a display device exhibiting improved alignment (e.g., alignment degree) of light emitting elements.

Embodiments of the present disclosure also provide a display device that ensures sufficient performance of pixel circuits.

A display device, according to an embodiment of the present disclosure, includes: a base layer; a pixel circuit layer on the base layer, the pixel circuit layer including lower lines, the pixel circuit layer having a line-free area in which the lower lines are not present; and a light-emitting-element layer on the pixel circuit layer, the light-emitting-element layer including electrodes and a light emitting element on the electrodes, the light-emitting-element layer having an electrode-free area in which the electrodes are not present. The line-free area overlaps the electrode-free area in a plan view.

The lower lines may be not present in a first area, the lower lines may be present in a second area, and, in the plan view, the line-free area may overlap the first area but does not overlap the second area.

In the plan view, the electrode-free area may overlap the first area but may not overlap the second area.

The line-free area and the electrode-free area may overlap the light emitting element in the plan view.

The lower lines may include a lower auxiliary electrode layer, a first interlayer conductive layer, and a second interlayer conductive layer, and at least one of the lower auxiliary electrode layer, the first interlayer conductive layer, and the second interlayer conductive layer may be in the second area.

The display device may further include: a plurality of the light emitting elements; a first sub-pixel, a second sub-pixel, and a third sub-pixel; and a first pixel circuit of the first sub-pixel, a second pixel circuit of the second sub-pixel, and a third pixel circuit of the third sub-pixel. Each of the first pixel circuit, the second pixel circuit, and the third pixel circuit may include a storage capacitor, and the storage capacitor may include a first storage capacitor of the first pixel circuit, a second storage capacitor of the second pixel circuit, and a third storage capacitor of the third pixel circuit. The electrodes may include a first electrode and a second electrode that are spaced apart from each other in a first direction, and the first storage capacitor, the second storage capacitor, and the third storage capacitor may be arranged in a second direction different from the first direction.

The first storage capacitor, the second storage capacitor, and the third storage capacitor may be adjacent to each other in one area between adjacent ones of the first sub-pixel, the second sub-pixel, and the third sub-pixel in the first direction.

The first pixel circuit, the second pixel circuit, and the third pixel circuit may include a driving transistor and a switching transistor, and a gate electrode of the switching transistor may extend through a sub-pixel area of one of the first sub-pixel, the second sub-pixel, and the third sub-pixel in the second direction.

The display device may further include: a first power line for supplying a first power to the light emitting elements; and a second power line for supplying a second power different from the first power. At least a portion of the first power line may extend through a sub-pixel area of one of the first sub-pixel, the second sub-pixel, and the third sub-pixel in the second direction.

At least a portion of the second power line may extend through a sub-pixel area of another of the first sub-pixel, the second sub-pixel, and the third sub-pixel in the second direction.

The display device may further include: a first power line for supplying a first power to the light emitting element; and a second power line for supplying a second power different from the first power. The first power line may define a first hole area, and, in the plan view, the first hole area may overlap the line-free area and may overlap the electrode-free area.

The second power line may define a second hole area, and, in the plan view, the second hole area may overlap the line-free area and may overlap the electrode-free area.

The display device of may further include an overlapping conductive layer adjacent to the second hole area, and the overlapping conductive layer may overlap the second power line in the plan view.

The first area may be provided in plurality, and the first areas may be adjacent to each other in the first direction. At least a portion of the lower lines extending from the storage capacitor may be between the first areas adjacent to each other in the first direction.

The lower lines may include a lower auxiliary electrode layer on the base layer, a first interlayer conductive layer on the lower auxiliary electrode layer, and a second interlayer conductive layer on the first interlayer conductive layer, and each of the first pixel circuit, the second pixel circuit, and the third pixel circuit may include a driving transistor. The first interlayer conductive layer may form a gate electrode of the driving transistor, and, in the plan view, at least a portion of the lower auxiliary electrode layer, the gate electrode of the driving transistor, and an upper overlapping conductive layer formed by the second interlayer conductive layer may overlap each other between the first areas adjacent to each other.

The light emitting element may be aligned between the spaced apart electrodes.

The light emitting element may include a first semiconductor layer, a second semiconductor layer, and an active layer between the first semiconductor layer and the second semiconductor layer, and the active layer may overlap the line-free area in the plan view.

The display device may further include: an anode connection electrode electrically connected to a first end portion of the light emitting element; and a cathode connection electrode electrically connected to a second end portion of the light emitting element.

A display device, according to an embodiment of the present disclosure, includes: a base layer; pixels on the base layer, each of the pixels including light emitting elements; and power lines on the base layer, the power lines configured to supply a power to the pixels. The power lines include a first power line for supplying a first power to the light emitting elements and a second power line for supplying a second power different from the first power to the light emitting elements, the first power line defines a hole area, and at least a portion of the light emitting elements are in the hole area.

A display device, according to an embodiment of the present disclosure, includes: a base layer; a pixel on the base layer, the pixel including sub-pixels, each of the sub-pixels including light emitting elements; and a pixel circuit layer on the base layer, the pixel circuit layer including lower lines for forming pixel circuits electrically connected to the light emitting elements. The sub-pixel includes a first sub-pixel, a second sub-pixel, and a third sub-pixel, and the pixel circuits include a first pixel circuit of the first sub-pixel, a second pixel circuit of the second sub-pixel, and a third pixel circuit of the third sub-pixel. The first pixel circuit includes a first storage capacitor, the second pixel circuit includes a second storage capacitor, and the third pixel circuit includes a third storage capacitor, and each of the sub-pixels includes a first electrode and a second electrode that are spaced apart from each other in a first direction. The light emitting elements are aligned on the first electrode and the second electrode, the first storage capacitor, the second storage capacitor, and the third storage capacitor are arranged in a second direction different from the first direction, and an electrode-free area between the first electrode and the second electrode does not overlap the lower lines in a plan view.

BRIEF DESCRIPTION OF THE DRAWINGS

Embodiments of the present disclosure will now be described more fully hereinafter with reference to the accompanying drawings; however, the present disclosure may be embodied in different forms and should not be construed as limited to the embodiments set forth herein. Rather, these embodiments are provided so that this disclosure will be thorough and complete and will fully convey the scope of the present disclosure to those skilled in the art.

DETAILED DESCRIPTION

Figure 1:
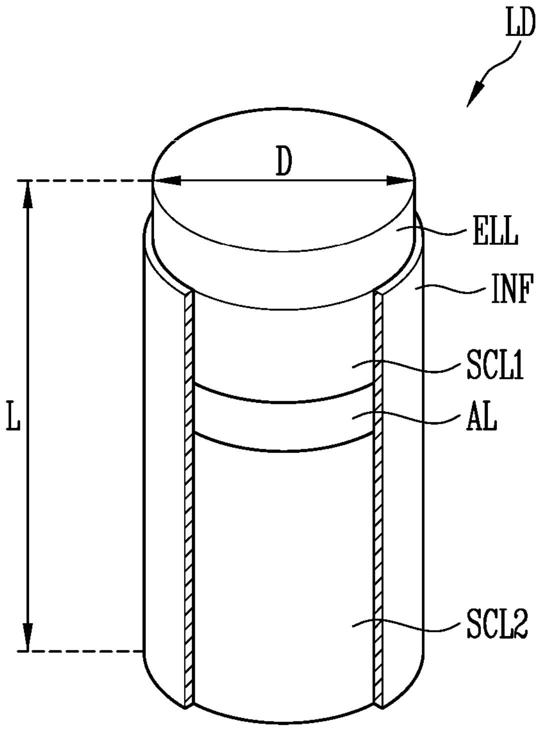
FIG. 1 is a schematic perspective view illustrating a light emitting element in accordance with an embodiment of the present disclosure.

The present disclosure may have various changes and different shapes; therefore, the embodiments illustrated and described herein are merely particular examples of the present disclosure and are not limiting thereof. However, the embodiments do not limit to certain shapes but apply to all the change and equivalent material and replacement.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. Further, an expression that an element, such as a layer, region, substrate, or plate, is placed "on" or "above" another element indicates not only a case where the element is placed "directly on" or "just above" the other element but also a case where a further element is interposed between the element and the other element. An expression that an element, such as a layer, region, substrate, or plate, is placed "beneath" or "below" another element indicates not only a case where the element is placed "directly beneath" or "just below" the other element but also a case where a further element is interposed between the element and the other element.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Embodiments of the present disclosure generally relate to a display device. Hereinafter, a display device in accordance with embodiments of the present disclosure will be described with reference to the accompanying drawings.

Figure 2:
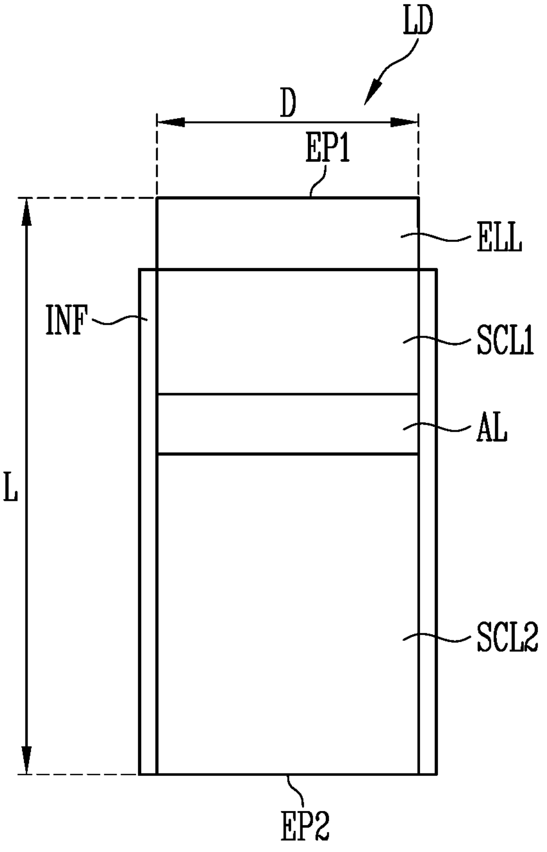
FIG. 2 is a schematic sectional view illustrating the light emitting element shown in FIG. 1.

First, a light emitting element LD in accordance with an embodiment of the present disclosure will be described with reference to FIGS. 1 and 2. FIG. 1 is a schematic perspective view illustrating a light emitting element in accordance with an embodiment of the present disclosure. FIG. 2 is a schematic sectional view illustrating the light emitting element shown in FIG. 1.

The light emitting element LD is configured to emit light. The light emitting element LD may include a first semiconductor layer SCL1, a second semiconductor layer SCL2, and an active layer AL disposed between the first semiconductor layer SCL1 and the second semiconductor layer SCL2. In some embodiments, the first semiconductor layer SCL1, the active layer AL, and the second semiconductor layer SCL2 may be sequentially stacked in a length L direction of the light emitting element LD. In some embodiments, the light emitting element LD may further include an electrode layer ELL and an insulative film INF.

The light emitting element LD may have various shapes. For example, the light emitting element LD may have a pillar shape extending in one direction (e.g., in the length direction). The pillar shape may include a rod-like shape or bar-like shape, which is long (or elongated) in the length L direction (e.g., its aspect ratio is greater than 1), such as a cylinder or a polyprism, but its cross-sectional shape is not particularly limited.

The light emitting element LD may have a first end portion EP1 and a second end portion EP2. In some embodiments, the first semiconductor layer SCL1 may be adjacent to the first end portion EP1 of the light emitting element LD, and the second semiconductor layer SCL2 may be adjacent to the second end portion EP2 of the light emitting element LD. When present, the electrode layer ELL may be adjacent to the first end portion EP1.

The light emitting element LD may be manufactured by etching sequentially stacked semiconductor layers. The light emitting element LD may have a size of nanometer scale to micrometer scale. For example, each of a diameter D (or width) of the light emitting element LD and a length L may have a range of nanometer scale to micrometer. However, the present disclosure is not necessarily limited thereto.

The first semiconductor layer SCL1 may include a first conductivity type semiconductor. The first semiconductor layer SCL1 may be disposed on the active layer AL and may include a semiconductor layer having a type different from a type of the second semiconductor layer SCL2. For example, the first semiconductor layer SCL1 may include a P-type semiconductor layer. For example, the first semiconductor layer SCL1 may include at least one semiconductor material selected from the group consisting of InAlGaN, GaN, AlGaN, InGaN, AlN, and InN and may include a P-type semiconductor layer doped with a first conductivity type dopant, such as Ga, B, or Mg. However, the present disclosure is not limited to the above-described example. The first semiconductor layer SCL1 may include various suitable materials.

The active layer AL may be disposed between the first semiconductor layer SCL1 and the second semiconductor layer SCL2. The active layer AL may include (or may be) a single-quantum well structure or a multi-quantum well structure. The position of the active layer AL is not limited and may be variously changed according to the kind (or type) of the light emitting element LD.

A clad layer doped with a conductive dopant may be formed at one side and/or the other side of the active layer AL. For example, the clad layer may include at least one of AlGaN and InAlGaN. However, the present disclosure is not necessarily limited to the above-described example.

The second semiconductor layer SCL2 may be a second conductivity type semiconductor. The second semiconductor layer SCL2 may be disposed on the active layer AL and may include a semiconductor layer having a type different from the type of the first semiconductor layer SCL1. For example, the second semiconductor layer SCL2 may include an N-type semiconductor layer. For example, the second semiconductor layer SCL2 may include at least one semiconductor material selected from the group consisting of InAlGaN, GaN, AlGaN, InGaN, AlN, and InN and may include an N-type semiconductor layer doped with a second conductivity type dopant, such as Si, Ge, or Sn. However, the present disclosure is not limited to the above-described example. The second semiconductor layer SCL2 may include various suitable materials.

When a voltage of a threshold voltage or greater is applied to the first end portion EP1 and the second end portion EP2 of the light emitting element LD, electron-hole pairs may be combined in the active layer AL, and the light emitting element LD may emit light. The light emission of the light emitting element LD is controlled according to such a principle so that the light emitting element LD can be used as a light source for various devices.

The insulative film INF may be disposed on one surface of the light emitting element LD. The insulative film INF may surround an outer surface of the active layer AL. In addition, the insulative film INF may further surround a portion of each of the first semiconductor layer SCL1 and the second semiconductor layer SCL2. The insulative film INF may have a single-layer or a multi-layer structure.

The insulative film INF may expose the first end portion EP1 and the second end portion EP2 of the light emitting element LD, which have different polarities. For example, the insulative film INF may expose one end of each of the electrode layer ELL and the second semiconductor layer SCL2, which are respectively adjacent to the first end portion EP1 and the second end portion EP2 of the light emitting element LD. The insulative film INF can ensure the electrical stability of the light emitting element LD. Also, the insulative film INF reduces or minimizes a surface defect in the light emitting element LD, thereby improving the lifetime (or lifespan) and efficiency of the light emitting element LD. In addition, when a plurality of light emitting elements LD are densely arranged (or disposed), the insulative film INF can prevent a short circuit defect between the light emitting elements LD.

In accordance with an embodiment, the insulative film INF may include at least one selected from the group consisting of silicon oxide ($SiO_x$), silicon nitride ($SiN_x$), silicon oxynitride ($SiO_xN_y$), aluminum oxide ($AlO_x$), and titanium oxide ($TiO_x$). However, the present disclosure is not necessarily limited to the above-described example.

The electrode layer ELL may be disposed on the first semiconductor layer SCL1. The electrode layer ELL may be adjacent to the first end portion EP1. The electrode layer ELL may be electrically connected to the first semiconductor layer SCL1. A portion of the electrode layer ELL may be exposed. For example, the insulative film INF may expose one surface of the electrode layer ELL. The electrode layer ELL may be exposed in an area corresponding to the first end portion EP1. In some embodiments, a side surface of the electrode layer ELL may be (may also be) exposed. For example, the insulative film INF may not cover (e.g., may expose) at least a portion of the side surface of the electrode layer ELL while covering a side surface of each of the first semiconductor layer SCL1, the active layer AL, and the second semiconductor layer SCL2. Thus, the electrode layer ELL adjacent to the first end portion EP1 can be readily connected to another component. In some embodiments, the insulating layer INF may expose not only the side surface of the electrode layer ELL but also a portion of a side surface of the first semiconductor layer SCL1 and/or the second semiconductor layer SCL2.

In accordance with an embodiment, the electrode layer ELL may be an ohmic contact electrode. However, the present disclosure is not necessarily limited to the above-described example. For example, the electrode layer ELL may be a Schottky contact electrode.

In accordance with an embodiment, the electrode layer ELL may include at least one selected from the group consisting of chromium (Cr), titanium (Ti), aluminum (Al), gold (Au), nickel (Ni), and any oxide or alloy thereof. However, the present disclosure is not necessarily limited to the above-described example. In some embodiments, the electrode layer ELL may be substantially transparent. For example, the electrode layer ELL may include indium tin oxide (ITO). Accordingly, the electrode layer EEL enables emitted light to be transmitted therethrough (e.g., the electrode layer EEL is light transmissive).

The structure, shape, and the like of the light emitting element LD are not limited to the above-described example. In some embodiments, the light emitting element LD may have various structures and various shapes. For example, the light emitting element LD may further include an additional electrode layer which is disposed on one surface of the second semiconductor layer SCL2 and is adjacent to the second end portion EP2.

Figure 3:
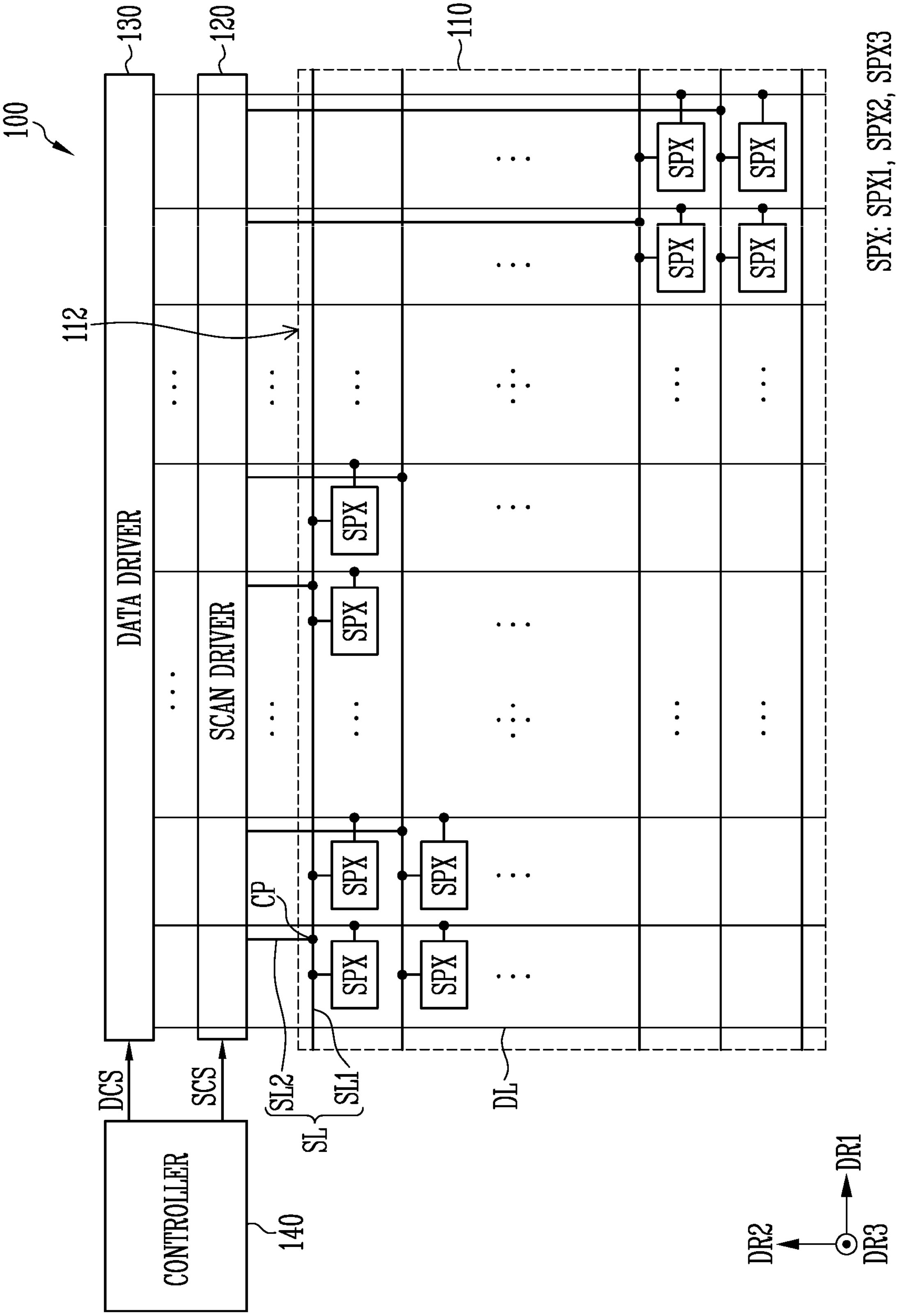
FIG. 3 is a block diagram schematically illustrating a display device in accordance with an embodiment of the present disclosure.

Next, a display device 100 in accordance with an embodiment of the present disclosure will be described with reference to FIG. 3. FIG. 3 is a block diagram schematically illustrating a display device in accordance with an embodiment of the present disclosure.

The display device 100 is configured to emit light. The display device 100 may be an electronic device using the light emitting element LD as a light source. In some embodiments, the display device 100 may include a pixel unit 110, a scan driver 120, a data driver 130, and a controller 140.

The pixel unit 110 may include a plurality of sub-pixels SPX connected to scan lines SL and data lines DL. In some embodiments, at least one of (e.g., three of) the sub-pixels PXL may form a pixel PXL (see, e.g., FIG. 8) (or a pixel unit). For example, the sub-pixel SPX may include a first sub-pixel SPX1 for emitting light of a first color (e.g., red), a second sub-pixel SPX2 for emitting light of a second color (e.g., green), and a third sub-pixel SPX3 for emitting light of a third color (e.g., blue). However, the present disclosure is not limited to the above-described example.

The scan driver 120 may be disposed at a side 112 of the pixel unit 110. The scan driver 120 may receive a first control signal SCS from the controller 140. The scan driver 120 may provide a scan signal to the sub-pixel SPX. The scan driver 120 may supply the scan signal to the scan lines SL in response to the first control signal SCS. For example, the scan signal may be provided to the sub-pixel SPX through a first scan line SL1 extending in a first direction DR1 and a second scan line SL2 extending in a second direction DR2.

The first control signal SCS may be a signal for controlling a driving timing of the scan driver 120. The first control signal SCS may include a scan start signal for the scan signal and a plurality of clock signals. The scan signal may be set to a gate-on level corresponding to the type of a transistor to which the corresponding scan signal is supplied.

The data driver 130 may be disposed at the side 112 of the pixel unit 110. The data driver 130 may receive a second control signal DCS from the controller 140. The data driver 130 may provide a data signal to the sub-pixel SPX. The data driver 130 may supply the data signal to the data line DL in response to the second control signal DCS. For example, the second control signal DCS may be provided to the sub-pixel SPX through the data line DL. The second control signal DCS may be a signal for controlling a driving timing of the data driver 130.

In accordance with an embodiment, the display device 100 may further include a compensator. The compensator may receive a third control signal for sensing of the sub-pixels SPX and degradation compensation from the controller 140. The compensator may receive a sensing value (e.g., current or voltage information) extracted from the sub-pixel SPX through a sensing line (see, e.g., 'SENL' in FIG. 4). The compensator may generate a compensation value for compensating for degradation of the sub-pixel SPX based on the sensing value.

In some embodiments, the display device 100 may have a single side driving structure (or arrangement) in which the scan driver 120 and the data driver 130 are disposed at the side (e.g., the same side) 112 of the pixel unit 110. In such an embodiment, the scan driver 120 and the data driver 130 may be disposed at the same side with respect to the pixel unit 110. For example, when the display device 100 generally includes four sides, the scan driver 120 and the data driver 130 may be disposed adjacent to the same one side of any of the four sides. However, the present disclosure is not necessarily limited thereto.

In accordance with an embodiment, the scan line SL may include the first scan line SL1 and the second scan line SL2, which extend in different directions.

The first scan line SL1 may extend in the first direction to be electrically connected to sub-pixels SPX of a pixel row corresponding thereto. The second scan line SL2 may extend in the second direction DR2 to be electrically connected to the first scan line SL1 at a contact area (or contact point) CP. A scan signal supplied through the second scan line SL2 may be supplied to the sub-pixels SPX through the first scan line SL1.

The first scan line SL1 may be connected to at least one second scan line SL2. For example, referring to a pixel row illustrated at a top side of the pixel unit 110 shown in FIG. 3, the first scan line SL1 may be electrically connected to any one of the second scan lines SL2 in one area and electrically connected to another of the second scan lines SL2 in another area.

The data line DL may extend in a pixel column (e.g., the second direction DR2) to be electrically connected to a sub-pixel SPX. The data line DL may supply a data signal to the sub-pixel SPX connected thereto.

A pixel row direction is a horizontal direction (e.g., the first direction DR1). A pixel column direction is a vertical direction (e.g., the second direction DR2). The pixel row may be defined by the second scan line SL2. The pixel row direction may be equal (or substantially parallel) to a direction in which the side 112 of the pixel unit 110, at where the scan driver 120 and the data driver 130 are disposed, extends.

Although an embodiment in which the scan driver 120, the data driver 130, and the controller 140 are distinguished from (e.g., are separate from) one another is illustrated in FIG. 3, at least some of the scan driver 120, the data driver 130, and the controller 140 may be integrated into one module or one integrated circuit chip (IC chip). Also, in some embodiments, the scan driver 120 may be disposed at a side of the pixel unit 110 different from the side 112 of the pixel unit 110 so that the scan line SL is configured with only the first scan line SL1.

Figure 4:
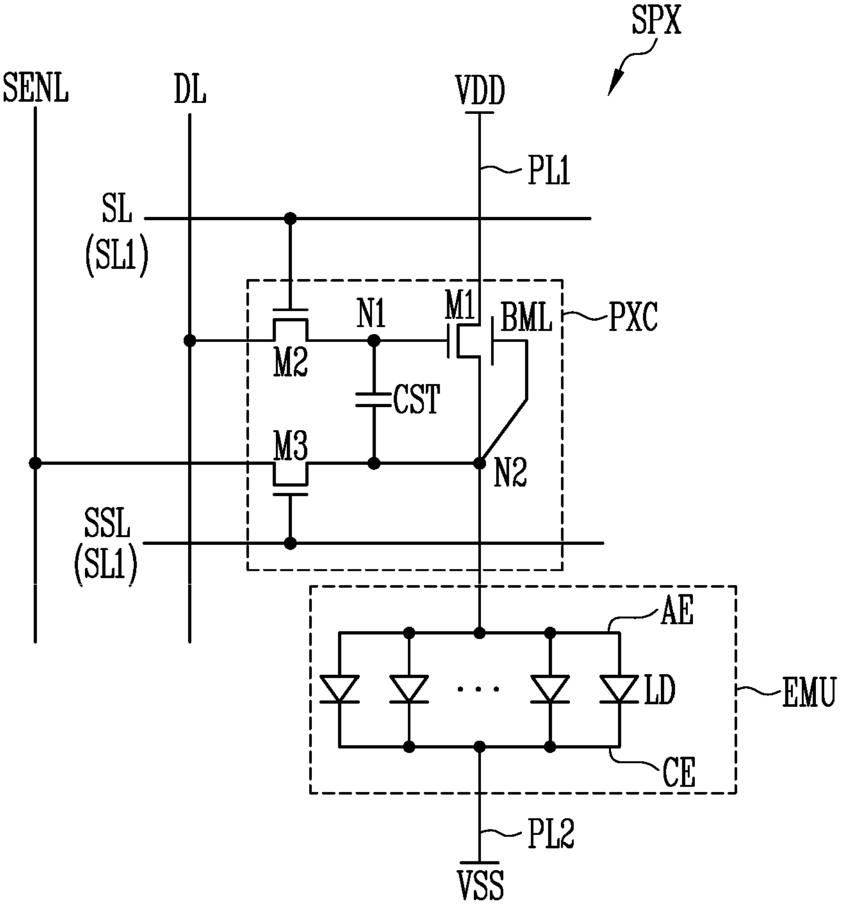
FIG. 4 is a diagram schematically illustrating a pixel circuit included in a sub-pixel in accordance with an embodiment of the present disclosure.

FIG. 4 is a diagram schematically illustrating a pixel circuit included in a sub-pixel in accordance with an embodiment of the present disclosure.

Referring to FIG. 4, the sub-pixel SPX may include a pixel circuit PXC. The pixel circuit PXC may be configured to drive a light emitting unit EMU (or light emitting elements LD). Each of sub-pixels SPX for forming one pixel unit may include the pixel circuit PXC.

The pixel circuit PXC may be electrically connected to a scan line SL, a data line DL, a first power line PL1, and a second power line PL2. In FIG. 4, the scan line SL may refer to the above-described first scan line SL1. For convenience of description, the first scan line SL1 is designated and described as the scan line SL.

The sub-pixel SPX may include the light emitting unit EMU (or the light emitting elements LD) configured to emit light corresponding to a data signal provided from the data line DL.

The pixel circuit PXC may be disposed between the first power line PL1 and the light emitting unit EMU. The pixel circuit PXC may be electrically connected to the scan line SL, to which a first scan signal is supplied, and the data line DL, to which a data signal is supplied. The pixel circuit PXC may be electrically connected to a scan control line SSL, to which a second scan signal is supplied to electrically connect the pixel circuit PXC to a sensing line SENL connected to a reference power (or initialization power) or a sensing circuit. In some embodiments, the second scan signal may be equal to or different from the first scan signal. When the second scan signal is equal to the first scan signal, the scan control line SSL may be integrated with the scan line SL.

The pixel circuit PXC may include at least one circuit element. For example, the pixel circuit PXC may include a first transistor M1, a second transistor M2, a third transistor M3, and a storage capacitor Cst.

The first transistor M1 may be electrically connected between the first power line PL1 and a second node N2. The second node N2 may be a node at which the pixel circuit PXC and the light emitting unit EMU are connected to each other. For example, the second node N2 may be a node at which a first source electrode SE1 (see, e.g., FIG. 7) of the first transistor M1 and an anode connection electrode AE of the light emitting unit EMU are connected to each other. A gate electrode GE1 (see, e.g., FIG. 7) of the first transistor M1 may be electrically connected to a first node N1. The first transistor M1 may control a driving current supplied to the light emitting unit EMU, corresponding to a voltage of the first node N1. The first transistor M1 may be a driving transistor.

In some embodiments, a portion of a lower auxiliary electrode layer BML (e.g., a first lower auxiliary electrode layer 1200) may be disposed under the first transistor M1. A back-biasing technique (or sync technique) may be applied, in which a threshold voltage of the first transistor M1 is moved in a negative direction or positive direction by applying a back-biasing voltage to the first lower auxiliary electrode layer 1200 in driving of the sub-pixel SPX.

The second transistor M2 may be electrically connected between the data line DL and the first node N1. In addition, a second gate electrode GE2 (see, e.g., FIG. 11) of the second transistor M2 may be electrically connected to the scan line SL. The second transistor M2 may be turned on when the first scan signal having a gate-on voltage (e.g., a high level voltage) is supplied from the scan line SL to electrically connect the data line DL and the first node N1 to each other.

A data signal of a corresponding frame is supplied to the data line for each frame period. The data signal is transferred to the first node N1 through the second transistor M2 during a period in which the first scan signal having the gate-on voltage is supplied. For example, the second transistor M2 may be a switching transistor for transferring each data signal to the inside of the sub-pixel SPX.

One electrode of the storage capacitor Cst may be electrically connected to the first node N1, and the other electrode of the storage capacitor Cst may be electrically connected to the second node N2. The storage capacitor Cst charges a voltage corresponding to the data signal supplied to the first node N1 during each frame period.

The third transistor M3 may be electrically connected between the second node N2 and the sensing line SENL. A third gate electrode GE3 (see, e.g., FIG. 11) of the third transistor M3 may be connected to the scan control line SSL (or the scan line SL). The third transistor M3 may be turned on when the second scan signal (or the first scan signal) having the gate-on voltage (e.g., the high level voltage) is supplied from the scan control line SSL, to transfer, to the second node N2, a reference voltage (or initialization voltage) supplied to the sensing line SENL, or to transfer a voltage of the second node N2 to the sensing line SENL. The voltage of the second node N2, which is transferred to the sensing circuit through the sensing line SENL, may be provided to an external circuit (e.g., the controller 140) to be used for compensating for a characteristic deviation of sub-pixels SPX and the like.

Although an embodiment in which the transistors included in the pixel circuit PXC are all N-type transistors is illustrated in FIG. 4, the present disclosure is not limited thereto. For example, at least one of the first, second, and third transistors M1, M2, and M3 may be changed to a P-type transistor. In addition, the structure and driving method of the sub-pixel SPX may be variously changed in some embodiments.

The light emitting unit EMU may include the anode connection electrode AE, a cathode connection electrode CE, and at least one light emitting element LD and is electrically connected between the first power line PL1 and the second power line PL2. For example, the light emitting unit EMU may include the anode connection electrode AE connected to the first power line PL1 through the first transistor M1, the cathode connection electrode CE connected to the second power line PL2, and the at least one light emitting elements LD connected between the anode connection electrode AE and the cathode connection electrode CE. In accordance with an embodiment, the light emitting unit EMU may include a plurality of light emitting elements LD connected in parallel between the anode connection electrode AE and the cathode connection electrode CE.

A power of the first power line PL1 and a power of the second power line PL2 may have different potentials. For example, the first power line PL1 may be electrically connected to a high-potential pixel power VDD, to be supplied with a high-potential power, and the second power line PL2 may be electrically connected to a low-potential pixel power VSS, to be supplied with a low-potential power. A potential difference between the power of the first power line PL1 and the power of the second power line PL2 (e.g., a potential difference between the high-potential power VDD and the low-potential power VSS) may be set to be equal to or higher than a threshold voltage of the light emitting elements LD.

The first power line PL1 may be electrically connected to the first transistor M1. The second power line PL2 may be electrically connected to the cathode connection electrode CE.

The emitting elements LD may be connected in a forward direction between the first power line PL1 and the second power line PL2 to form respective effective light sources. These effective light sources constitute the light emitting unit EMU of the sub-pixel SPX.

The light emitting elements LD may emit light with a luminance corresponding to a driving current supplied through the pixel circuit PXC. The pixel circuit PXC may supply a driving current corresponding to a data signal to the light emitting unit EMU during each frame period. The driving current supplied to the light emitting unit EMU may be divided to flow through the light emitting elements LD. Accordingly, the light emitting unit EMU can emit light with a luminance corresponding to the driving current while each light emitting element LD emits light with a luminance corresponding to a current flowing therethrough.

Although an embodiment in which the sub-pixel SPX includes the light emitting unit EMU having a parallel structure is shown in FIG. 4, the present disclosure is not limited thereto. For example, the sub-pixel SPX may include a light emitting unit EMU having a serial structure or a series/parallel structure. The pixel circuit PXC of the sub-pixel SPX in accordance with embodiments of the present disclosure is not limited to the above-described example. In some embodiments, the pixel circuit PXC may further include seven transistors and one storage capacitor.

Hereinafter, a structure of electrodes of the display device 100 in accordance with an embodiment of the present disclosure will be described.

Figure 5:
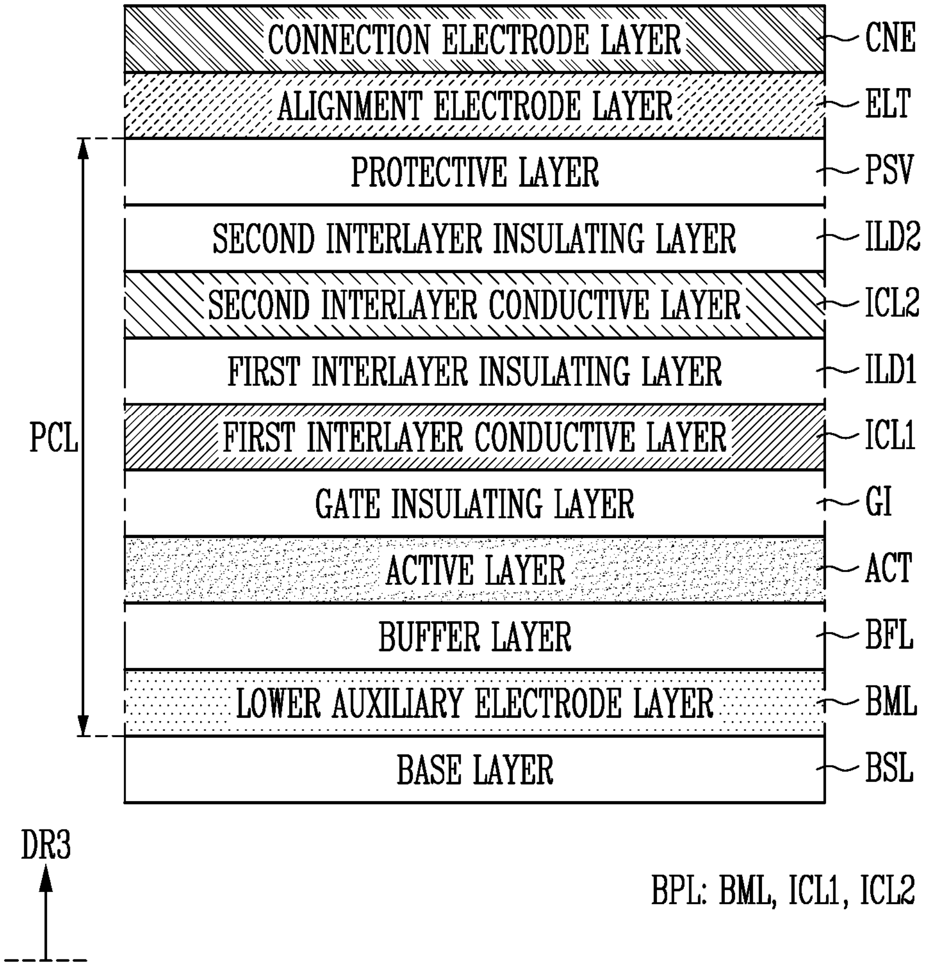
FIG. 5 is a schematic sectional view illustrating a stacked structure of the display device in accordance with an embodiment of the present disclosure.

First, a stacked structure of the display device 100 according to an embodiment will be described with reference to FIG. 5. FIG. 5 is a schematic sectional view illustrating a stacked structure of the display device in accordance with an embodiment of the present disclosure. In the figures following FIG. 5, the same layer described with reference to FIG. 5 (e.g., patterning in the same process) may be illustrated by using the same hatching for ease of understanding.

Referring to FIG. 5, the stacked structure of the display device 100 in accordance with an embodiment of the present disclosure may have a form in which at least a portion in a structure is patterned, in which a base layer BSL, a lower auxiliary electrode layer BML, a buffer layer BFL, an active layer ACT, a gate insulating layer GI, a first interlayer conductive layer ICL1, a first interlayer insulating layer ILD1, a second interlayer conductive layer ICL2, a second interlayer insulating layer ILD2, a protective layer PSV, an alignment electrode layer ELT, and a connection electrode layer CNE are sequentially stacked.

In accordance with an embodiment, the lower auxiliary electrode layer BML, the buffer layer BFL, the active layer ACT, the gate insulating layer GI, the first interlayer conductive layer ICL1, the first interlayer insulating layer ILD1, the second interlayer conductive layer ICL2, the second interlayer insulating layer ILD2, and the protective layer PSV may form a pixel circuit layer PCL including pixel circuits PXC. In some embodiments, the lower auxiliary electrode layer BML, the first interlayer conductive layer ICL1, and the second interlayer conductive layer ICL2 may form lower lines BPL. The lower lines BPL are lines forming the pixel circuit layer PCL and may include lines (e.g., lines or electrodes) formed under the alignment electrode layer ELT.

The base layer BSL may form (or constitute) a base surface of the display device 100. The base layer BSL may include a rigid or flexible substrate or film. The substance of the base layer BSL or the material constituting the base layer BSL is not limited to a specific example, and the base layer BSL may include various suitable materials.

The buffer layer BFL may prevent an impurity from being diffused into the active layer ACT and/or may prevent moisture from infiltrating into the active layer ACT. In accordance with an embodiment, the buffer layer BFL may include at least one selected from the group consisting of silicon nitride ($SiN_x$), silicon oxide ($SiO_x$), silicon oxynitride ($SiO_xN_y$), and aluminum oxide ($AlO_x$). However, the present disclosure is not necessarily limited to the above-described example.

The active layer ACT may include a semiconductor. For example, the active layer ACT may include at least one selected from the group consisting of poly-silicon, Low Temperature Polycrystalline Silicon (LTPS), amorphous silicon, and an oxide semiconductor. In accordance with an embodiment, the active layer ACT may form a channel of the first transistor M1, the second transistor M2, and the third transistor M3, and an impurity may be doped into portions of the active layer ACT, which are in contact with source/drain electrodes (e.g., a first source electrode SE1 and a first drain electrode DE1, which are shown in, for example, FIG. 7).

The lower auxiliary electrode layer BML, the first interlayer conductive layer ICL1, the second interlayer conductive layer ICL2, the alignment electrode layer ELT, and the connection electrode layer CNE may include a conductive material.

In accordance with an embodiment, each of the lower auxiliary electrode layer BML, the first interlayer conductive layer ICL1, and the second interlayer conductive layer ICL2 may include at least one conductive layer. In accordance with an embodiment, each of the lower auxiliary electrode layer BML, the first interlayer conductive layer ICL1, and the second interlayer conductive layer ICL2 may include at least one selected from the group consisting of gold (Au), silver (Ag), aluminum (Al), molybdenum (Mo), chromium (Cr), titanium (Ti), nickel (Ni), neodymium (Nd), copper (Cu), and platinum (Pt). However, the present disclosure is not necessarily limited to the above-described example.

The gate insulating layer GI, the first interlayer insulating layer ILD1, the second interlayer insulating layer ILD2, and the protective layer PSV may be disposed between the active layer ACT, the first interlayer conductive layer ICL1, the second interlayer conductive layer ICL2, and the alignment electrode layer ELT to electrically separate (or electrically isolate) the active layer ACT, the first interlayer conductive layer ICL1, the second interlayer conductive layer ICL2, and the alignment electrode layer ELT from each other. In accordance with an embodiment, the above-described conductive layers may be electrically connected to each other at (or through) contact holes (e.g., contact openings) formed in at least one of the gate insulating layer GI, the first interlayer insulating layer ILD1, the second interlayer insulating layer ILD2, and the protective layer PSV.

In accordance with an embodiment, the gate insulating layer GI, the first interlayer insulating layer ILD1, and the second interlayer insulating layer ILD2 may include an inorganic material. For example, the inorganic material may include at least one selected from the group consisting of silicon nitride ($SiN_x$), silicon oxide ($SiO_x$), silicon oxynitride ($SiO_xN_y$), and aluminum oxide ($AlO_x$). In some embodiments, the protective layer PSV may include an organic material. For example, an organic material may include at least one selected from the group consisting of acrylic resin, epoxy resin, phenolic resin, polyamide resin, polyimide resin, unsaturated polyester resin, poly-phenylene ether resin, poly-phenylene sulfide resin, and benzocyclobutene (BCB). However, the present disclosure is not necessarily limited to the above-described example.

In accordance with an embodiment, the alignment electrode layer ELT may include a conductive material. For example, the alignment electrode layer ELT may include at least one selected from the group consisting of molybdenum (Mo), a magnesium (Mg), silver (Ag), platinum (Pt), palladium (Pd), gold (Au), nickel (Ni), neodymium (Nd), iridium (Ir), chromium (Cr), titanium (Ti), copper (Cu), and aluminum (Al). However, the present disclosure is not necessarily limited to the above-described example.

In accordance with an embodiment, the connection electrode layer CNE may include a conductive material. The connection electrode layer CNE may be electrically connected to the light emitting element LD. In some embodiments, the connection electrode layer CNE may include a transparent conductive material. For example, the connection electrode layer CNE may include at least one selected from the group consisting of Indium Tin Oxide (ITO), Indium Zinc Oxide (IZO), and Indium Tin Zinc Oxide (ITZO). However, the present disclosure is not necessarily limited to the above-described example. A first insulating layer INS1 (see, e.g., FIG. 7) may be disposed between the alignment electrode layer ELT and the connection electrode layer CNE.

Next, schematic planar and sectional structures of a sub-pixel SPX in accordance with an embodiment of the present disclosure will be described with reference to FIGS. 6 to 8. In addition, a structure of electrodes of the display device 100 in accordance with an embodiment of the present disclosure will be described with reference to FIGS. 9 to 17. In addition, a structure of electrodes of the display device 100 in accordance with an embodiment of the present disclosure will be described with reference to FIGS. 18 and 19. In FIGS. 6 to 19, descriptions of portions that are the same or substantially similar to the above-described portions will be simplified or will not be repeated.

Figure 6:
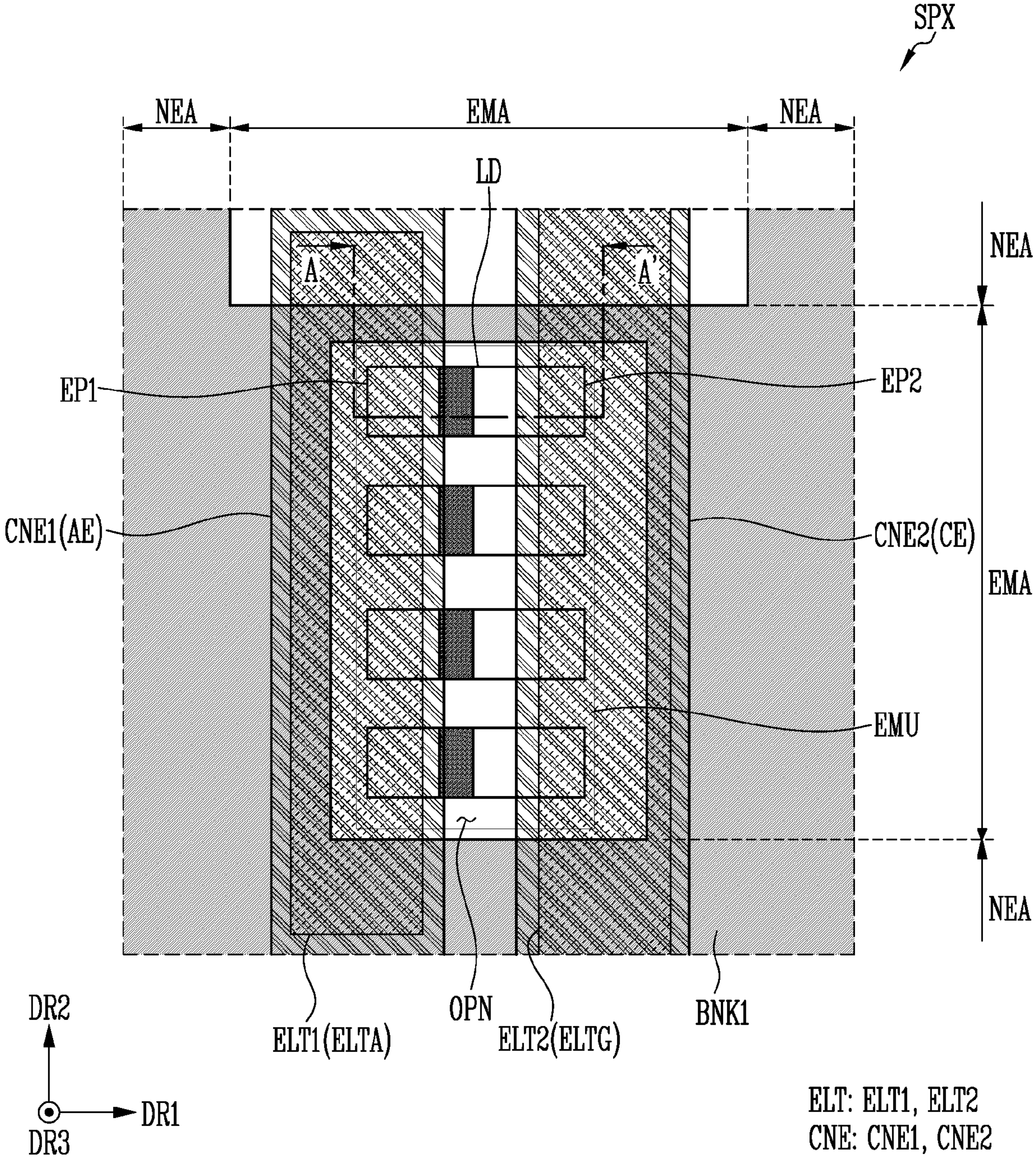
FIGS. 6 and 7 are schematic plan and cross-sectional views, respectively, illustrating a sub-pixel in accordance with an embodiment of the present disclosure.
Figure 7:
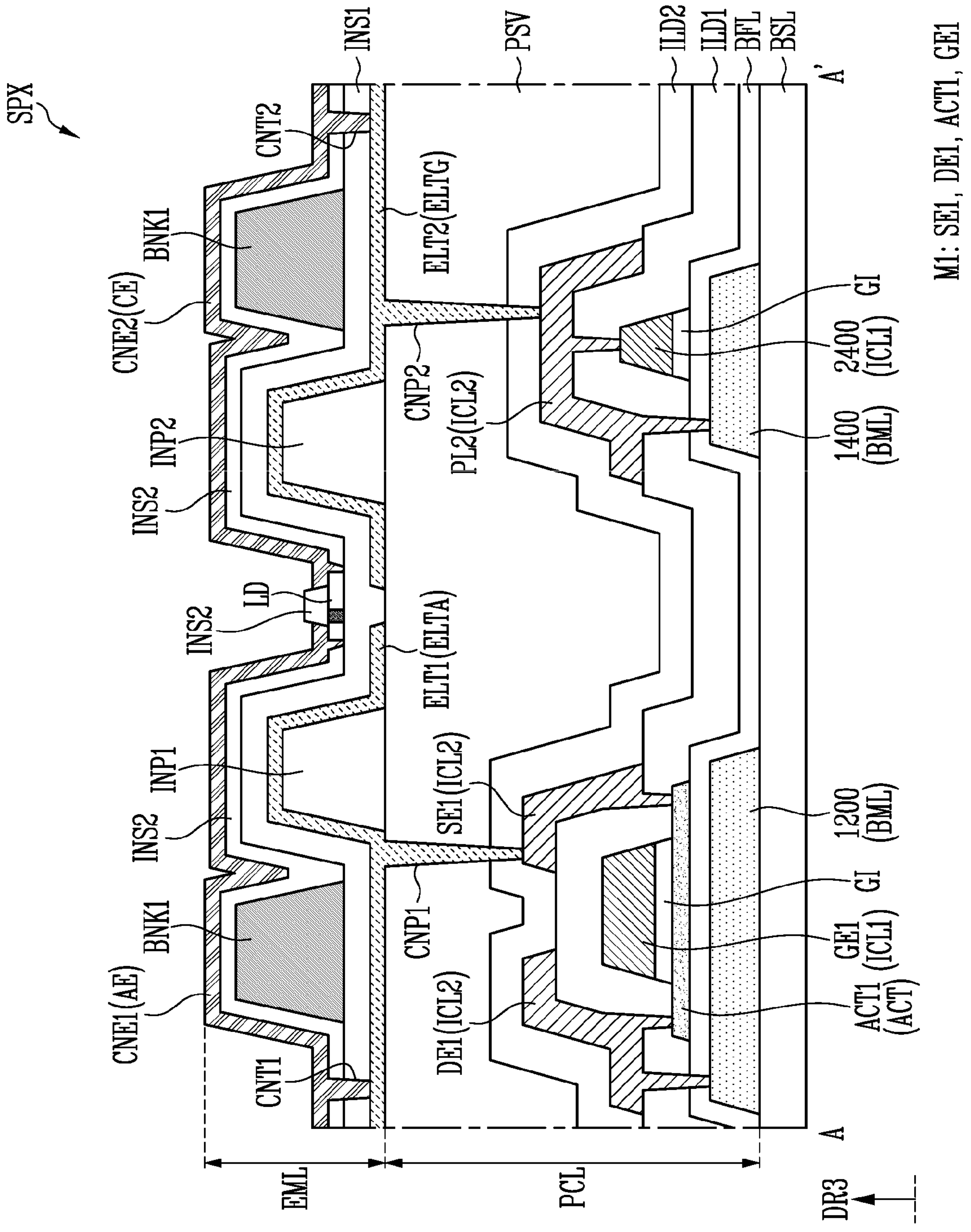

FIGS. 6 and 7 are schematic views illustrating a sub-pixel in accordance with an embodiment of the present disclosure. FIG. 6 is a schematic plan view illustrating a sub-pixel SPX in accordance with an embodiment of the present disclosure. FIG. 7 is a schematic cross-sectional (or sectional) view taken along the line A-A' in FIG. 6. FIG. 8 is a schematic cross-sectional view illustrating a pixel in accordance with an embodiment of the present disclosure.

The sub-pixel SPX may have an emission area EMA and a non-emission area NEA. The sub-pixel SPX may include a first bank BNK, an alignment electrode layer ELT, light emitting elements LD, and a connection electrode layer CNE.

The emission area EMA may overlap (or may correspond to) an opening OPN defined by (or defined in) the first bank BNK1 in a plan view. The light emitting elements LD may be disposed in the emission area EMA. The light emitting elements LD may not be disposed in the non-emission area NEA.

The first bank BNK1 may form (or provide) the opening OPN. For example, the first bank BNK1 may have a shape protruding in a thickness direction of the base layer BSL (e.g., a third direction DR3) to surround (e.g., to extend around a periphery of) one area. In some embodiments, an ink including the light emitting elements LD may be supplied (or printed) into the opening OPN defined by the first bank BNK1 so that the light emitting elements LD are disposed in the opening OPN.

In some embodiments, the first bank BNK1 may include an organic material, such as acrylic resin, epoxy resin, phenolic resin, polyamide resin, polyimide resin, unsaturated polyester resin, poly-phenylene ether resin, poly-phenylene sulfide resin, or benzocyclobutene (BCB). However, the present disclosure is not limited to the above-described example.

The alignment electrode layer ELT may include electrodes for aligning the light emitting elements LD. In some embodiments, the alignment electrode layer ELT may include a first electrode ELT1 and a second electrode ELT2.

In some embodiments, the first electrode ELT1 may be a first alignment electrode ELTA, and the second electrode ELT2 may be a second alignment electrode ELTG.

The light emitting element LD may be disposed (or aligned) on the alignment electrode layer ELT. In some embodiments, in a plan view, the light emitting element LD may be aligned between the first electrode ELT1 and the second electrode ELT2. The light emitting elements LD may form (or constitute) a light emitting unit EMU.

In accordance with an embodiment, the first electrode ELT1 and the second electrode ELT2 may be spaced apart from each other in the first direction DR1 in the emission area EMA.

In accordance with an embodiment, the first electrode ELT1, as the first alignment electrode ELTA, may be an electrode to which an AC signal can be supplied to align the light emitting elements LD. The first electrode ELT1 may be an electrode to which an anode signal can be supplied such that the light emitting elements LD emit light. The second electrode ELT2, as the second alignment electrode ELTG, may be an electrode to which a ground signal can be supplied to align the light emitting elements LD. The second electrode ELT2 may be an electrode to which a cathode signal can be supplied such that the light emitting elements LD emit light.

The first electrode ELT1 (or the first alignment electrode ELTA) and the second electrode ELT2 (or the second alignment electrode ELTG) may be respectively supplied (or provided) with a first alignment signal and a second alignment signal in a process of aligning the light emitting elements LD. For example, the ink including the light emitting elements LD may be supplied (or provided) into the opening OPN, the first alignment signal may be supplied to the first electrode ELT1, and the second alignment signal may be supplied to the second electrode ELT2. The first alignment signal and the second alignment signal may have different waveforms, different potentials, and/or different phases. For example, the first alignment signal may be the AC signal, and the second alignment signal may be the ground signal. However, the present disclosure is not necessarily limited to the above-described example. An electric field may be formed between (or on) the first electrode ELT1 and the second electrode ELT2 so that the light emitting elements LD are aligned between the first electrode ELT1 and the second electrode ELT2 based on (or according to) the electric field. For example, the light emitting elements LD may be moved (or rotated) by a force (e.g., a dielectrophoresis (DEP) force) according to the electric field to be aligned (or disposed) on the first alignment electrode ELTA and the second alignment electrode ELTG.

The light emitting element LD may emit light based on an electrical signal provided thereto. For example, the light emitting element LD may provide (or emit) light based on a first electrical signal (e.g., an anode signal) provided from a first connection electrode CNE1 and a second electrical signal (e.g., a cathode signal) provided from a second connection electrode CNE2.

A first end portion EP1 of the light emitting element LD may be disposed to be adjacent to the first electrode ELT1, and a second end portion EP2 thereof may be disposed to be adjacent to the second electrode ELT2.

The connection electrode layer CNE may be disposed on first end portions EP1 and second end portions EP2 of the light emitting elements LD. The first connection electrode CNE1 may be disposed on the first end portions EP1 of the light emitting elements LD to be electrically connected to the first end portions EP1. The second connection electrode CNE2 may be disposed on the second end portions EP2 of the light emitting elements LD to be electrically connected to the second end portions EP2.

In some embodiments, the connection electrode layer CNE may include the first connection electrode CNE1 and the second connection electrode CNE2. The first connection electrode CNE2 may be an anode connection electrode AE, and the second connection electrode CNE2 may be a cathode connection electrode CE.

In FIG. 7, a cross-sectional structure of the sub-pixel SPX is schematically illustrated based on a pixel circuit layer PCL in which a pixel circuit PXC is formed and a light-emitting-element layer EML in which the light emitting elements LD are disposed.

Referring to FIG. 7, the sub-pixel SPX may include the pixel circuit layer PCL and the light-emitting-element layer EML. For convenience of description, a first transistor M1 in the pixel circuit PXC is primarily described in FIG. 7.

The base layer BSL may provide an area in which the pixel circuit layer PCL and the light-emitting-element layer EML are disposed.

The pixel circuit layer PCL may be disposed on the base layer BSL. The pixel circuit layer PCL may include the layers described above with reference to FIG. 5. For example, the pixel circuit layer PCL may include a first lower auxiliary electrode layer 1200, a second lower auxiliary electrode layer 1400, the first transistor M1, and a second power line PL2.

A first lower auxiliary electrode layer 1200 and the second lower auxiliary electrode layer 1400 may be formed by the lower auxiliary electrode layer BML. The first lower auxiliary electrode layer 1200 may be electrically connected to a first drain electrode DE1 of the first transistor M1 and may overlap a first active layer ACT1 of the first transistor M1 in a plan view. The second lower auxiliary electrode layer 1400 may be electrically connected to the second power line PL2.

A buffer layer BFL may be disposed on the base layer BSL. The buffer layer BFL may cover the lower auxiliary electrode layer BML.

The first transistor M1 may be a thin film transistor. The first transistor M1 may be electrically connected to the light emitting element LD. The first transistor M1 may include the first active layer ACT1, the first drain electrode DE1, a first source electrode SE1, and a first gate electrode GE1.

The first active layer ACT1 may be formed by an active layer ACT and may have a first contact region in contact with the first drain electrode DE1 and a second contact region in contact with the first source electrode SE1.

The first gate electrode GE1 may be disposed on a gate insulating layer GI. A position of the first gate electrode GE1 may correspond to a position of a channel region of the first active layer ACT1 (e.g., the first gate electrode GE1 may overlap the channel region of the first active layer ACT1 in a plan view).

The gate insulating layer GI may be disposed on the buffer layer BFL. The gate insulating layer GI may cover the first active layer ACT1.

A first interlayer insulating layer ILD1 may be disposed on the gate insulating layer GI. The first interlayer insulating layer ILD1 may cover the first gate electrode GE1 and a conductive layer 2400. The conductive layer 2400 may be formed by the first interlayer conductive layer ICL1 and may be electrically connected to the second power line PL2.

The first drain electrode DE1 and the first source electrode SE1 may be disposed on the first interlayer insulating layer ILD1. The first drain electrode DE1 may be electrically connected to a first power line PL1. The first source electrode SE1 may be electrically connected to a first electrode ELT1 through a first contact member CNP1 penetrating (e.g., extending through) a second interlayer insulating layer ILD2 and a protective layer PSV.

The second power line PL2 may be disposed on the first interlayer insulating layer ILD1. The second power line PL2 may be electrically connected to the second lower auxiliary electrode layer 1400 and may be electrically connected to a second electrode ELT2 through a second contact member CNP2 penetrating (e.g., extending through) the second interlayer insulating layer ILD2 and the protective layer PSV.

The second interlayer insulating layer ILD2 may be disposed on the first interlayer insulating layer ILD1. The second interlayer insulating layer ILD2 may cover the first drain electrode DE1, the first source electrode SE1, and the second power line PL2.

The protective layer PSV may be disposed on the second interlayer insulating layer ILD2. In some embodiments, the protective layer PSV may be a via layer.

The light-emitting-element layer EML may be disposed on the pixel circuit layer PCL. The light-emitting-element layer EML may include first and second insulating patterns INP1 and INP2, an alignment electrode layer ELT, a first insulating layer INS1, a first bank BNK1, the light emitting element LD, a second insulating layer INS2, and a connection electrode layer CNE.

The first and second insulating patterns INP1 and INP2 may be disposed on the protective layer PSV. The first and second insulating patterns INP1 and INP2 may have various shapes. In an embodiment, the first and second insulating patterns INP1 and INP2 may protrude in the thickness direction of the base layer BSL (e.g., the third direction DR3).

The first and second insulating patterns INP1 and INP2 may form a step difference (e.g., a predetermined step difference) such that the light emitting elements LD can be readily aligned in the emission area EMA. In some embodiments, the first and second insulating patterns INP1 and INP2 may be partition walls. In some embodiments, the first and second insulating patterns INP1 and INP2 may include at least one organic material and/or an inorganic material. However, the present disclosure is not necessarily limited to a specific example.

The alignment electrode layer ELT may be disposed on the protective layer PSV and/or the first and second insulating patterns INP1 and INP2. The first electrode ELT1 may be supplied with a first alignment signal and/or first power through the first contact member CNP1. The second electrode ELT2 may be supplied with a second alignment signal and/or second power through the second contact member CNP2.

The first insulating layer INS1 may be disposed on the alignment electrode layer ELT. For example, the first insulating layer INS1 may cover the first electrode ELT1 and the second electrode ELT2.

The first bank BNK1 may be disposed on the first insulating layer INS1. The first bank BNK1 may form a space (or an opening) in which an ink including the light emitting element LD can be accommodated as described above.

The light emitting element LD may be disposed on the first insulating layer INS1 in an area surrounded by the first bank BNK1. In some embodiments, the light emitting element LD may emit light based on an electrical signal (e.g., an anode signal and a cathode signal) provided from a first connection electrode CNE1 and a second connection electrode CNE2.

The second insulating layer INS2 may be disposed on the light emitting element LD. The second insulating layer INS2 may cover an active layer AL of the light emitting element LD. The second insulating layer INS2 may expose at least a portion of the light emitting element LD. For example, the second insulating layer INS2 may not cover (e.g., may expose) a first end portion EP1 and a second end portion EP2 of the light emitting element LD. Accordingly, the first end portion EP1 and the second end portion EP2 of the light emitting element LD may be exposed and may be electrically connected to the first connection electrode CNE1 and the second connection electrode CNE2, respectively. In some embodiments, another portion of the second insulating layer INS2 may be disposed on the first bank BNK1 and the first insulating layer INS1.

When the second insulating layer INS2 is formed on the light emitting elements LD after the light emitting elements LD are aligned (or completely aligned), the light emitting elements LD can be prevented from being separated (or moved) from positions their aligned positions.

The second insulating layer INS2 may have a single-layer or multi-layer structure. The second insulating layer INS2 may include at least one selected from the group consisting of silicon oxide ($SiO_x$), silicon nitride ($SiN_x$), silicon oxynitride ($SiO_xN_y$), aluminum nitride ($AlN_x$), aluminum oxide ($AlO_x$), zirconium oxide ($ZrO_x$), hafnium oxide ($HfO_x$), and titanium oxide ($TiO_x$). However, the present disclosure is not limited to the above-described example.

The first connection electrode CNE1 and the second connection electrode CNE2 may be disposed on the first insulating layer INS1 and the second insulating layer INS2. The first connection electrode CNE1 may be electrically connected to the first end portion EP1 of the light emitting element LD. The second connection electrode CNE2 may be electrically connected to the second end portion EP2 of the light emitting element LD.

The first connection electrode CNE1 may be electrically connected to the first electrode ELT1 through a first contact part CNT1 penetrating (e.g., extending through) the first insulating layer INS1, and the second connection electrode CNE2 may be electrically connected to the second electrode ELT2 through a second contact part CNT2 penetrating (e.g., extending through) the first insulating layer INS1. In some embodiments, the first connection electrode CNE1 may be directly electrically connected to a line of the pixel circuit layer PCL through the first contact part CNT1. The second connection electrode CNE2 may be directly electrically connected to a line of the pixel circuit layer PCL through the second contact part CNT2.

In accordance with an embodiment, the first connection electrode CNE1 and the second connection electrode CNE2 may be patterned through the same process at the same time. However, the present disclosure is not necessarily limited to the above-described example. In other embodiments, after any one of the first connection electrode CNE1 and the second connection electrode CNE2 is patterned, the other electrode may be patterned.

Figure 8:
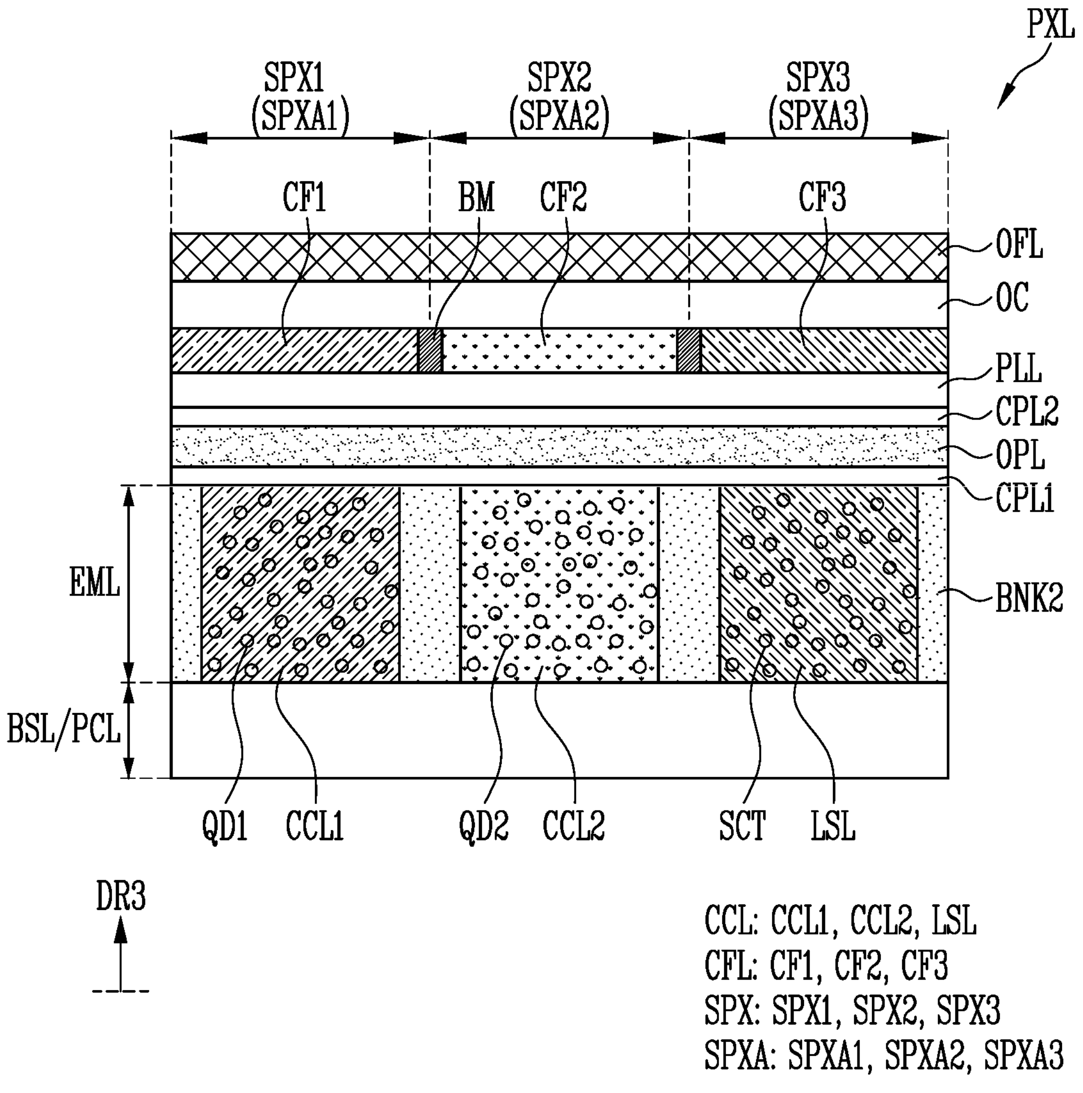
FIG. 8 is a schematic sectional view illustrating a pixel in accordance with an embodiment of the present disclosure.

In FIG. 8, a cross-sectional structure of sub-pixels SPX is schematically illustrated based on components disposed on the light-emitting-element layer EML.

Referring to FIG. 8, sub-pixel areas SPXA respectively corresponding to the sub-pixels SPX may be formed in the display area DA. The sub-pixel areas SPXA may include a first sub-pixel area SPXA1 corresponding to a first sub-pixel SPX1, a second sub-pixel area SPXA2 corresponding to a second sub-pixel SPX2, and a third sub-pixel area SPXA3 corresponding to a third sub-pixel SPX3. The first sub-pixel area SPXA1, the second sub-pixel area SPXA2, and the third sub-pixel area SPXA3 may be arranged in the first direction DR1.

A second bank BNK2 may be disposed between the first to third sub-pixel areas SPXA1, SPXA2, and SPXA3 or between boundaries of the first to third sub-pixel areas SPXA1, SPXA2, and SPXA3, and may define a space (or area) overlapping each of the first to third sub-pixel areas SPXA1, SPXA2, and SPXA3. The space defined by the second bank BNK2 may be an area in which a color conversion layer CCL can be provided.

The second bank BNK2 may be disposed to surround one area in the light-emitting-element layer EML. The second bank BNK2 may protrude in the thickness direction of the base layer BSL (e.g., the third direction DR3), thereby defining one area and a space in which the color conversion layer CCL can be provided may be formed in the one area.

The second bank BNK2 may include an organic material, such as acrylic resin, epoxy resin, phenolic resin, polyamide resin, polyimide resin, unsaturated polyester resin, poly-phenylene ether resin, poly-phenylene sulfide resin, or benzocyclobutene. However, the present disclosure is not necessarily limited thereto.

The color conversion layer CCL may be disposed above light emitting elements LD in the space surrounded by the second bank BNK2. The color conversion layer CCL may include a first color conversion layer CCL1 disposed in the first sub-pixel SPX1, a second color conversion layer CCL2 disposed in the second sub-pixel SPX2, and a light scattering layer LSL disposed in the third sub-pixel SPX3.

The color conversion layer CCL may be disposed above the light emitting element LD. The color conversion layer CCL may be configured to change a wavelength of light. In accordance with an embodiment, the first to third sub-pixels SPX1, SPX2, and SPX3 may include light emitting elements emitting light of the same color. For example, the first to third sub-pixels SPX1, SPX2, and SPX3 may include light emitting elements LD emitting light of a third color (or blue). The color conversion layer CCL including color conversion particles is disposed on each of the first to third sub-pixels SPX1, SPX2, and SPX3 so that a full-color image can be displayed.

The first color conversion layer CCL1 may include first color conversion particles for converting light of the third color, which is emitted from the light emitting element LD, into light of a first color. For example, the first color conversion layer CCL1 may include a plurality of first quantum dots QD1 dispersed in a matrix material, such as base resin.

In accordance with an embodiment, when the light emitting element LD is a blue light emitting element emitting blue light, and the first sub-pixel SPX1 is a red pixel, the first color conversion layer CCL1 may include a first quantum dot QD1 for converting blue light, which is emitted from the blue light emitting element, into red light. The first quantum dot QD1 may absorb blue light and emit red light by shifting a wavelength of the blue light according to energy transition. When the first sub-pixel SPX1 is a pixel of another color, the first color conversion layer CCL1 may include a first quantum dot QD1 corresponding to the color of the first sub-pixel SPX1.

The second color conversion layer CCL2 may include second color conversion particles for converting light of the third color, which is emitted from the light emitting element LD, into light of a second color. For example, the second color conversion layer CCL2 may include a plurality of second quantum dots QD2 dispersed in a matrix material, such as base resin.

In accordance with an embodiment, when the light emitting element LD is a blue light emitting element emitting blue light, and the second sub-pixel SPX2 is a green pixel, the second color conversion layer CCL2 may include a second quantum dot QD2 for converting blue light, which is emitted from the blue light emitting element, into green light. The second quantum dot QD2 may absorb blue light and emit green light by shifting a wavelength of the blue light according to energy transition. When the second sub-pixel SPX2 is a pixel of another color, the second color conversion layer CCL2 may include a second quantum dot QD2 corresponding to the color of the second sub-pixel SPX2.

In accordance with an embodiment, blue light having a relatively short wavelength in a visible light band is incident into the first quantum dot QD1 and the second quantum dot QD2 so that absorption coefficients of the first quantum dot QD1 and the second quantum dot QD2 can be increased. Accordingly, the efficiency of light finally emitted from the first sub-pixel SPX1 and the second sub-pixel SPX2 can be improved and excellent color reproduction can be ensured. In addition, the light emitting unit EMU of each of the first to third sub-pixels SPX1, SPX2, and SPX3 is configured by using light emitting elements of the same color (e.g., blue light emitting elements) so that the manufacturing efficiency of the display device 100 can be improved.

The light scattering layer LSL may be provided to efficiently use light of the third color (or blue) emitted from the light emitting element LD. In an example, when the light emitting element LD is a blue light emitting element emitting blue light, and the third sub-pixel SPX3 is a blue pixel, the light scattering layer LSL may include at least one kind of light scattering particle SCT to efficiently use (or emit) light emitted from the light emitting element LD. In an example, the light scattering particle SCT of the light scattering layer LSL may include at least one selected from the group consisting of barium sulfate ($BaSO_4$), calcium carbonate ($CaCO_3$), titanium oxide ($TiO_2$), silicon oxide ($SiO_2$), aluminum oxide ($Al_2O_3$), zirconium oxide ($ZrO_2$), and zinc oxide (ZnO). Although the light scattering particle SCT is not disposed only in the third sub-pixel SPX3, it may be selectively included in the first color conversion layer CCL1 or the second color conversion layer CCL2. In some embodiments, the light scattering particle SCT may be omitted, such that the light scattering layer LSL configured with transparent polymer is provided.

A first capping layer CPL1 may be disposed on the color conversion layer CCL. The first capping layer CPL1 may be provided throughout (e.g., in or over) the first to third sub-pixels SPX1, SPX2, and SPX3. The first capping layer CPL1 may cover the color conversion layer CCL. The first capping layer CPL1 may prevent the color conversion layer CCL from being damaged or contaminated due to infiltration of an impurity, such as moisture or air from the outside.

The first capping layer CPL1 is an inorganic layer and may include at least one selected from the group consisting of silicon nitride ($SiN_x$), aluminum nitride ($AlN_x$), titanium nitride ($TiN_x$), silicon oxide ($SiO_x$), aluminum oxide ($AlO_x$), titanium oxide ($TiO_x$), silicon oxycarbide ($SiO_xC_y$), and silicon oxynitride ($SiO_xN_y$).

An optical layer OPL may be disposed on the first capping layer CPL. The optical layer OPL may improve light extraction efficiency by recycling light provided from the color conversion layer CCL through total reflection. To this end, the optical layer OPL may have a refractive index relatively lower than a refractive index of the color conversion layer CCL. For example, the refractive index of the color conversion layer may be in a range of about 1.6 to about 2.0, and the refractive index of the optical layer OPL may be in a range of about 1.1 to about 1.3.

A second capping layer CPL2 may be disposed on the optical layer OPL. The second capping layer CPL2 may be provided throughout the first to third sub-pixels SPX1, SPX2, and SPX3. The second capping layer CPL2 may cover the optical layer OPL. The second capping layer CPL2 may prevent the optical layer OPL from being damaged or contaminated due to infiltration of an impurity, such as moisture or air from the outside.

The second capping layer CPL2 is an inorganic layer and may include at least one selected from the group consisting of silicon nitride ($SiN_x$), aluminum nitride ($AlN_x$), titanium nitride ($TiN_x$), silicon oxide ($SiO_x$), aluminum oxide ($AlO_x$), titanium oxide ($TiO_x$), silicon oxycarbide ($SiO_xC_y$), and silicon oxynitride ($SiO_xN_y$).

A planarization layer PLL may be disposed on the second capping layer CPL2. The planarization layer PLL may be provided throughout the first to third sub-pixels SPX1, SPX2, and SPX3.

The planarization layer PLL may include an organic material, such as acrylic resin, epoxy resin, phenolic resin, polyamide resin, polyimide resin, unsaturated polyester resin, poly-phenylene ether resin, poly-phenylene sulfide resin, or benzocyclobutene. However, the present disclosure is not necessarily limited thereto, and the planarization layer PLL may include various kinds of inorganic insulating materials, including silicon oxide ($SiO_x$), silicon nitride ($SiN_x$), silicon oxynitride ($SiO_xN_y$), aluminum nitride ($AlN_x$), aluminum oxide ($AlO_x$), zirconium oxide ($ZrO_x$), hafnium oxide ($HfO_x$), and titanium oxide ($TiO_x$).

A color filter layer CFL may be disposed on the planarization layer PLL. The color filter layer CFL may include color filters CF1, CF2, and CF3, which accord with a color of each pixel PXL. The color filters CF1, CF2, and CF3, which accord with colors of the respective first to third sub-pixels SPX1, SPX2, and SPX3, are disposed so that a full-color image can be displayed.

The color filter layer CFL may include a first color filter CF1 disposed in the first sub-pixel SPX1 to selectively transmit light emitted from the first sub-pixel SPX1 therethrough, a second color filter CF2 disposed in the second sub-pixel SPX2 to selectively transmit light emitted from the second sub-pixel SPX2 therethrough, and a third color filter CF3 disposed in the third sub-pixel SPX3 to selectively transmit light emitted from the third sub-pixel SPX3 therethrough.

In accordance with an embodiment, the first color filter CF1, the second color filter CF2, and the third color filter CF3 may be, respectively, a red color filter, a green color filter, and a blue color filter, but the present disclosure is not necessarily limited thereto. Hereinafter, when an arbitrary color filter from among the first color filter CF1, the second color filter CF2, and the third color filter CF3 is referred to or when two or more of the color filters are inclusively referred to, the corresponding color filter or the corresponding color filters are referred to as a "color filter CF" or "color filters CF."

The first color filter CF1 may overlap the first color conversion layer CCL1 in the thickness direction of the base layer BSL (e.g., the third direction DR3). The first color filter CF1 may include a color filter material for allowing light of a first color (e.g., red light) to be selectively transmitted therethrough. For example, when the first sub-pixel SPX1 is a red pixel, the first color filter CF1 may include a red color filter material.

The second color filter CF2 may overlap the second color conversion layer CCL2 in the thickness direction of the base layer BSL (e.g., the third direction DR3). The second color filter CF2 may include a color filter material for allowing light of a second color (e.g., green light) to be selectively transmitted therethrough. For example, when the second sub-pixel SPX2 is a green pixel, the second color filter CF2 may include a green color filter material.

The third color filter CF3 may overlap the light scattering layer LSL in the thickness direction of the base layer BSL (e.g., the third direction DR3). The third color filter CF3 may include a color filter material for allowing light of a third color (e.g., blue light) to be selectively transmitted therethrough. For example, when the third sub-pixel SPX3 is a blue pixel, the third color filter CF3 may include a blue color filter material.

In some embodiments, a light blocking layer BM may be further disposed between the first to third color filters CF1, CF2, and CF3. As described above, when the light blocking layer BM is formed between the first to third color filters CF1, CF2, and CF3, a color mixture defect viewable at the front or side of the display device 100 can be prevented. The material of the light blocking layer BM is not particularly limited, and the light blocking layer BM may be configured with various suitable light blocking materials. In an example, the light blocking layer BM may include a black matrix or may be implemented by stacking the first to third color filters CF1, CF2, and CF3.

An overcoat layer OC may be disposed on the color filter layer CFL. The overcoat layer OC may be provided throughout the first to third sub-pixels SPX1, SPX2, and SPX3. The overcoat layer OC may cover a lower member including the color filter layer CFL. The overcoat layer OC may prevent moisture or air from infiltrating into the above-described lower member. Also, the overcoat layer OC may protect the above-described lower member from a foreign matter, such as dust.

The overcoat layer OC may include an organic material, such as acrylic resin, epoxy resin, phenolic resin, polyamide resin, polyimide resin, unsaturated polyester resin, poly-phenylene ether resin, poly-phenylene sulfide resin, or benzocyclobutene. However, the present disclosure is not necessarily limited thereto, and the overcoat layer OC may include various inorganic insulating materials, including silicon oxide ($SiO_x$), silicon nitride ($SiN_x$), silicon oxynitride ($SiO_xN_y$), aluminum nitride ($AlN_x$), aluminum oxide ($AlO_x$), zirconium oxide ($ZrO_x$), hafnium oxide ($HfO_x$), and titanium oxide ($TiO_x$).

An outer film layer OFL may be disposed on the overcoat layer OC. The outer film layer OFL may be disposed at an outer portion of the display device 100 to reduce external influence. The outer film layer OFL may be provided throughout the first to third sub-pixels SPX1, SPX2, and SPX3. In some embodiments, the outer film layer OFL may include one of a polyethylene phthalate (PET) film, a low reflective film, a polarizing film, and a transmittance controllable film, but the present disclosure is not necessarily limited thereto. In some embodiments, the pixel PXL may include an upper substrate instead of the outer film layer OFL.

Next, a structure of electrodes of the display device 100 in accordance with an embodiment of the present disclosure will be described with reference to FIGS. 9 to 17. FIGS. 9 to 17 are views illustrating a structure of sub-pixels in accordance with an embodiment of the present disclosure. In FIGS. 9 to 17, descriptions of portions that are the same or substantially similar to the above-described portions will be simplified or will not be repeated.

Figure 9:
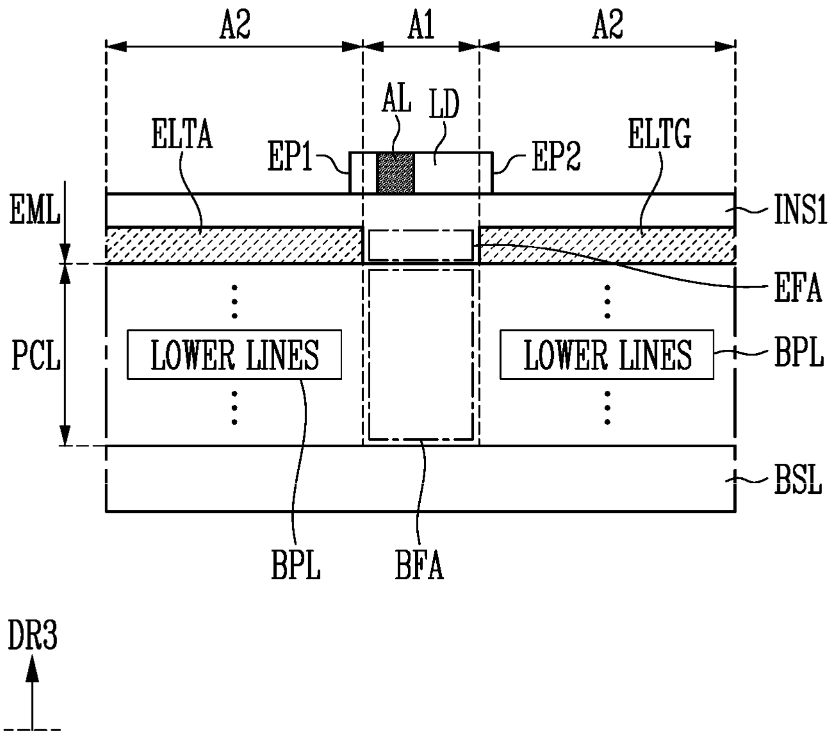
FIG. 9 is a schematic sectional view illustrating an arrangement relationship between lower lines and an alignment electrode layer in accordance with an embodiment of the present disclosure.

FIG. 9 is a schematic cross-sectional view illustrating an arrangement relationship between lower lines and an alignment electrode layer in accordance with an embodiment of the present disclosure. In FIG. 9, components of the pixel circuit layer PCL and the light-emitting-element layer EML on the base layer BSL are schematically illustrated.

Referring to FIG. 9, the display device 100 (or the sub-pixel SPX) may have a first area A1 and a second area A2. In accordance with an embodiment, lower lines BPL may be disposed (or patterned) in one area in the pixel circuit layer PCL. For example, the lower lines BPL may be disposed in the second area A2 and may not be disposed in (e.g., may be offset from or outside of) the first area A1. For example, at least one of the lower auxiliary electrode layer BML, the first interlayer conductive layer ICL1, and the second interlayer conductive layer ICL2 may be disposed in the second area A2.

The lower lines BPL may be selectively disposed in only some areas so that the pixel circuit layer PCL includes a line-free area BFA in which the lower lines BPL are not disposed. For example, the line-free area BFA may not overlap the lower lines BPL and the second area A2 in a plan view. The line-free area BFA may overlap the first area A1 in a plan view. In the line-free area BFA, an insulating layer(s) (e.g., at least one of the buffer layer BFL, the gate insulating layer GI, the first interlayer insulating layer ILD1, the second interlayer insulating layer ILD2, and the protective layer PSV) may be disposed on the base layer BSL in the pixel circuit layer PCL.

The alignment electrode layer ELT may be disposed (or patterned) in one area in the light-emitting-element layer EML. For example, the alignment electrode layer ELT may be disposed in the second area A2. The alignment electrode layer ELT may open (e.g., may be open or separated) at least a portion of the first area A1. For example, the first alignment electrode ELTA or the second alignment electrode ELTG may be disposed in the second area A2.

The first alignment electrode ELTA and the second alignment electrode ELTG may be selectively disposed in only a partial area to form an electrode-free area EFA. For example, the electrode-free area EFA may be an area defined by where the first alignment electrode ELTA and the second alignment electrode ELTG are spaced apart from each other. The electrode-free area EFA may not overlap the alignment electrode layer ELT and the second area A2 in a plan view. The electrode-free area EFA may overlap the first area A1 in a plan view. In some embodiments, the electrode-free area EFA may be entirely covered by (e.g., may entirely overlap) the line-free area BFA in a plan view.

The electrode-free area BFA may overlap light emitting elements LD in a plan view. In some embodiments, the electrode-free area EFA may overlap an active layer AL of each of the light emitting elements LD. For example, the electrode-free area EFA may correspond to an alignment area at where the light emitting elements LD are arranged between the first alignment electrode ELTA and the second alignment electrode ELTG. Similarly, the first area A1 may correspond to an alignment area at where the light emitting elements LD are arranged between the first alignment electrode ELTA and the second alignment electrode ELTG.

The electrode-free area EFA may not overlap the lower lines BPL and the second area A2 in a plan view. The electrode-free area EFA may overlap the first area A1 and the line-free area BFA in a plan view. Accordingly, in a plan view, the light emitting elements LD may overlap the first area A1 and may overlap the electrode-free area EFA and the line-free area BFA.

In accordance with an embodiment, the light emitting elements LD may be aligned based on an electric field formed between the first alignment electrode ELTA and the second alignment electrode ELTG. However, when the lower lines BPL are formed in an area between first alignment electrode ELTA and the second alignment electrode ELTG, electric fields formed therebetween are interfered with (or are influenced) by the lower lines BPL, and therefore, an alignment degree of the light emitting elements LD and reliability of alignment may be damaged. However, in accordance with an embodiment, the electrode-free area EFA corresponding to the alignment area in which the light emitting elements LD are arrange may overlap the line-free area BFA in which the lower lines BPL are not formed. Hence, the above-described risk can be substantially mitigated. For example, influence on electrical signals (e.g., an electric field and the like) for aligning the light emitting elements LD can be reduced, and consequently, the alignment degree of the light emitting elements LD can be substantially improved.

Next, a planar structure of electrodes for forming a sub-pixel SPX in addition to the above-described cross-sectional structure will be described in more detail with reference to FIGS. 10 to 13. In FIGS. 10 to 13, descriptions of portions that are the same or substantially similar to the above-described portions will be simplified or will not be repeated.

Figure 10:
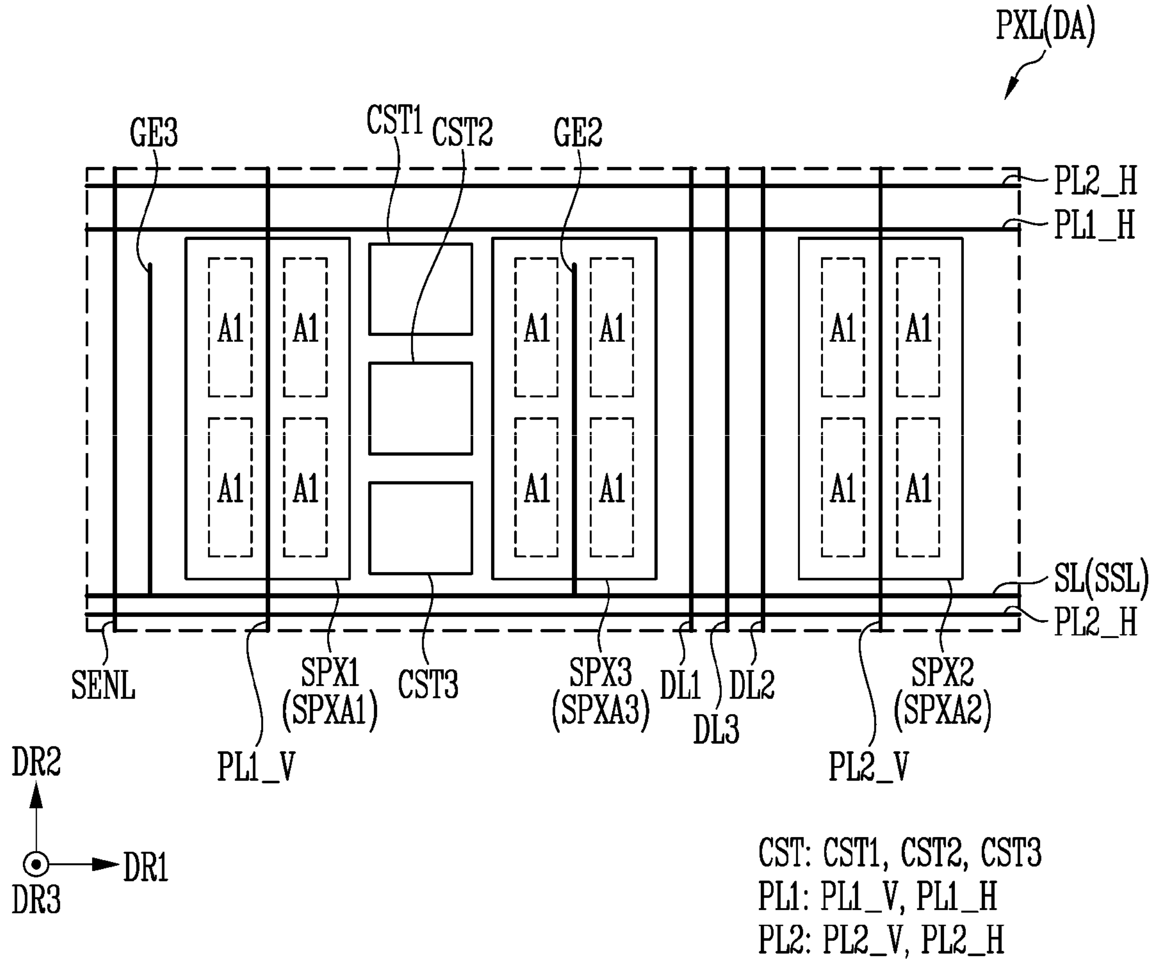
FIGS. 10 to 13 are schematic plan views illustrating an electrode structure in accordance with an embodiment of the present disclosure.
Figure 11:
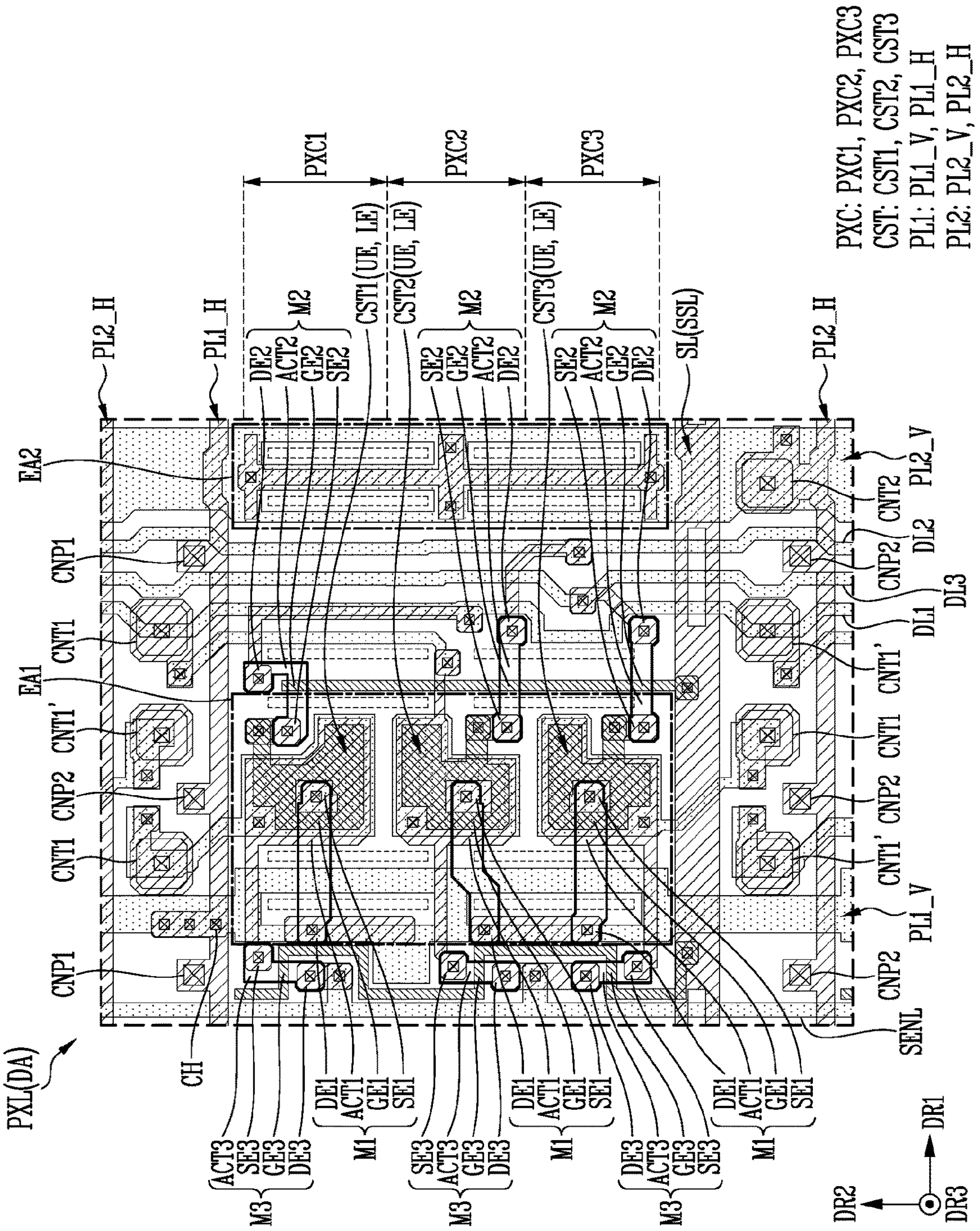
Figure 12:
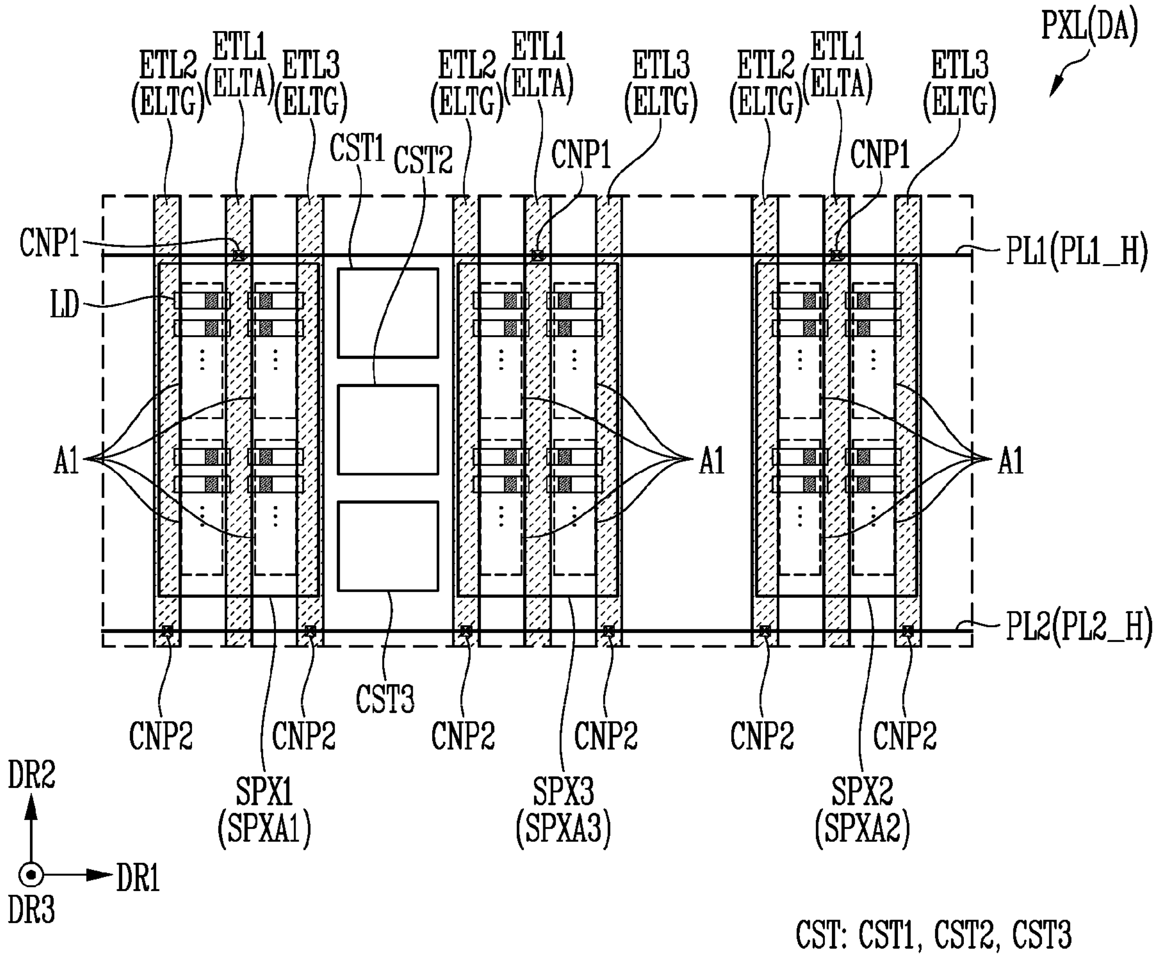
Figure 13:
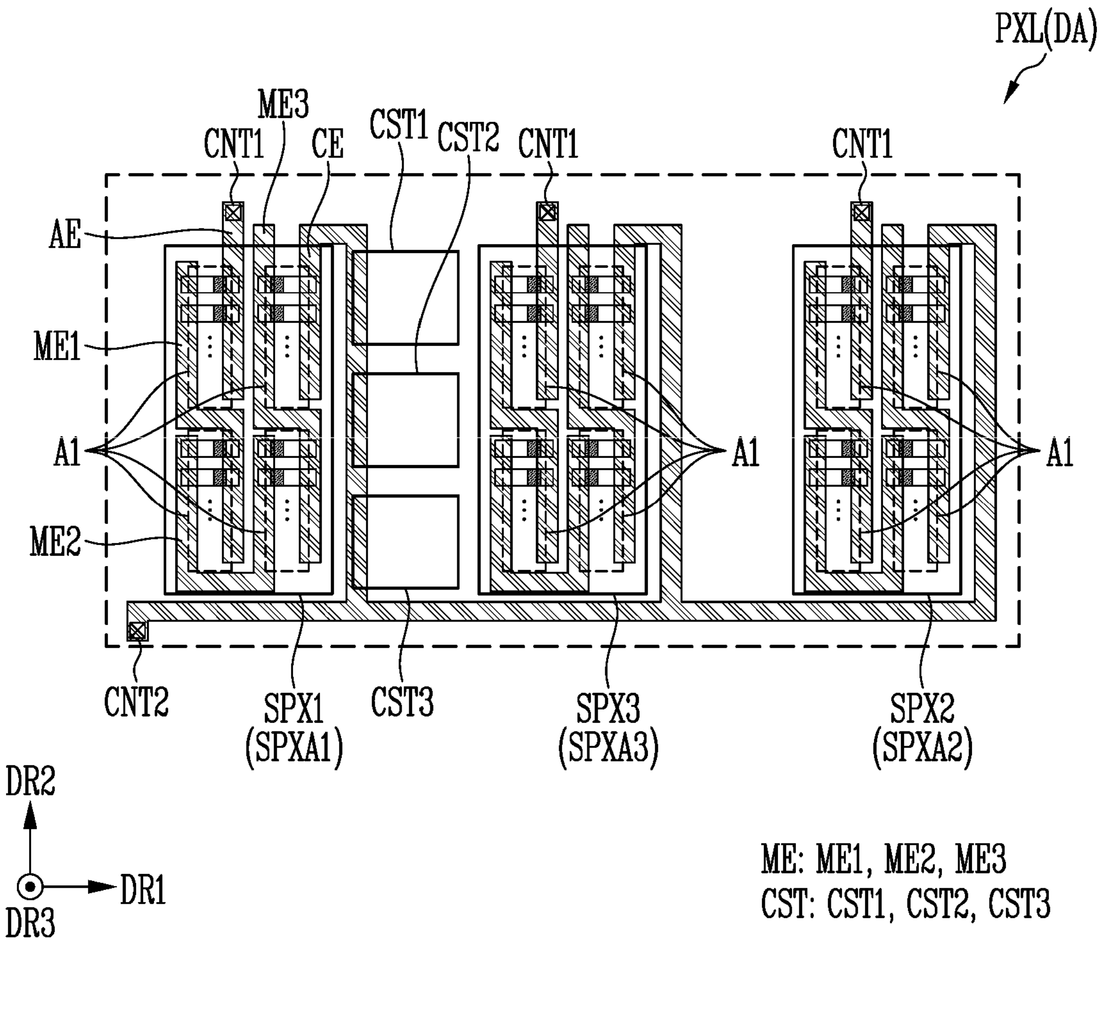

FIGS. 10 to 13 are schematic plan views illustrating an electrode structure in accordance with an embodiment of the present disclosure. FIGS. 10, 12, and 13 may be schematic plan views illustrating the electrode structure in accordance with an embodiment of the present disclosure. FIG. 11 may be a schematic view illustrating a planar structure of electrodes based on the electrode patterns described with reference to FIG. 5. FIGS. 10 and 11 may be views primarily illustrating a structure of the lower lines BPL. FIGS. 12 and 13 may be views illustrating a structure of the light-emitting-element layer EML. For example, FIG. 12 may be a view primarily illustrating a structure of the alignment electrode layer ELT and the light emitting elements LD, and FIG. 13 may be a view primarily illustrating a structure of the connection electrode layer CNE and the light emitting elements LD.

The lower auxiliary electrode layer BML, the active layer ACT, the first interlayer conductive layer ICL1, and the second interlayer conductive layer ICL2 are illustrated in FIG. 11. In FIG. 11, contact holes (e.g., contact openings) for electrically connecting different patterns (e.g., the lower auxiliary electrode layer BML, the active layer ACT, the first interlayer conductive layer ICL1, and the second interlayer conductive layer ICL2) to each other are illustrated in the form of an ‘X’ in a quadrangular shape. In FIG. 11, first and second contact members CNP1 and CNP2 are illustrated as an ‘X’ in a quadrangular shape. In FIG. 11, first and second contact parts CNT1 and CNT2 are illustrated in a quadrangular shape having a size relatively greater than a size of a contact hole. In FIG. 11, a first scan line SL1 from among scan lines SL is illustrated. For convenience of description, the first scan line SL1 is designated as a scan line SL. Also, in an embodiment in which a scan line SL and a scan control line SSL are integrated is illustrated in FIG. 11. In FIG. 11, a layer corresponding to the active layer ACT is illustrated as a line having a dark edge without hatching such that the drawing can be more clearly distinguished.

Referring to FIGS. 10 and 11, lower lines BPL for forming the pixel circuit layer PCL may be disposed (or patterned) in one area and may form pixel circuits PXC and lines connected to the pixel circuits PXC. In addition, a plurality of first areas A1 may be formed in each sub-pixel area SPXA. Light emitting elements LD may be disposed in each of the first areas A1.

The pixel circuit PXC may include a first pixel circuit PXC1, a second pixel circuit PXC2, and a third pixel circuit PXC3. Each of the first pixel circuit PXC1, the second pixel circuit PXC2, and the third pixel circuit PXC3 may include a first transistor M1, a second transistor M2, a third transistor M3, and a storage capacitor CST. The first pixel circuit PXC1, the second pixel circuit PXC2, and the third pixel circuit PXC3 may be spaced apart from each other in the second direction DR2. The first pixel circuit PXC1, the second pixel circuit PXC2, and the third pixel circuit PXC3 may be pixel circuits PXC of different sub-pixels SPX, respectively. For example, the first pixel circuit PXC1 may correspond to a first sub-pixel SPX1, the second pixel circuit PXC2 may correspond to a second sub-pixel SPX2, and the third pixel circuit PXC3 may correspond to a third sub-pixel SPX3.

In accordance with an embodiment, the first transistor M1 of each of the first pixel circuit PXC1, the second pixel circuit PXC2, and the third pixel circuit PXC3 may include a first source electrode SE1, a first gate electrode GE1, a first drain electrode DE1, and a first active layer ACT1. In accordance with an embodiment, the second transistor M2 of each of the first pixel circuit PXC1, the second pixel circuit PXC2, and the third pixel circuit PXC3 may include a second source electrode SE2, a second gate electrode GE2, a second drain electrode DE2, and a second active layer ACT2. In accordance with an embodiment, the third transistor M3 of each of the first pixel circuit PXC1, the second pixel circuit PXC2, and the third pixel circuit PXC3 may include a third source electrode SE3, a third gate electrode GE3, a third drain electrode DE3, and a third active layer ACT3.

In accordance with an embodiment, the second gate electrode GE2 of the second transistor M2 may overlap one of the sub-pixel areas SPXA. For example, the second gate electrode GE2 may extend through a third sub-pixel area SPXA3 in the first direction DR1. In some embodiments, the second gate electrode GE2 may be disposed between first areas A1 of the third sub-pixel SPX3.

The storage capacitor CST may include an upper electrode UE and a lower electrode LE. In some embodiments, the storage capacitor CST may include a first storage capacitor CST1 included in the first pixel circuit PXC1, a second storage capacitor CST2 included in the second pixel circuit PXC2, and a third storage capacitor CST3 included in the third pixel circuit PXC3. In some embodiments, each of the upper electrode UE and the lower electrode LE may correspond to at least one selected from the lower auxiliary electrode BML, the first interlayer conductive layer ICL1, and the second interlayer conductive layer ICL2.

The first storage capacitor CST1, the second storage capacitor CST2, and the third storage capacitor CST3 may be disposed between adjacent sub-pixel areas SPXA. For example, the first storage capacitor CST1, the second storage capacitor CST2, and the third storage capacitor CST3 may be disposed between a first sub-pixel area SPXA1 and the third sub-pixel area SPXA3.

The first storage capacitor CST1, the second storage capacitor CST2, and the third storage capacitor CST3 may be disposed adjacent to each other in the second direction DR2 in a partial area. For example, the first storage capacitor CST1, the second storage capacitor CST2, and the third storage capacitor CST3 are not spaced apart from each other in the first direction DR1 and may be sequentially arranged in the second direction DR2. The first storage capacitor CST1, the second storage capacitor CST2, and the third storage capacitor CST3 are inclusively formed in one area and, hence, an area in which the light emitting elements LD can be disposed can be sufficiently secured. In addition, the first storage capacitor CST1, the second storage capacitor CST2, and the third storage capacitor CST3 are disposed adjacent to each other in a partial area and, hence, circuit performance (e.g., a charging rate or the like) of the pixel circuits PXC can be sufficiently secured.

The scan line SL may extend in the first direction DR1. The scan line SL may be formed by the second interlayer conductive layer ICL2. In some embodiments, the scan line SL and the scan control line SSL may be integrally formed.

Data lines DL may extend in the second direction DR2. The data lines DL may be spaced apart from each other in the first direction DR1. The data lines DL may include a first data line DL1, a second data line DL2, and a third data line DL3. The first data line DL1 is a data line for the first pixel circuit PXC1 and may be electrically connected to the second drain electrode DE2 of the second transistor M2 of the first pixel circuit PXC1. The second data line DL2 is a data line for the second pixel circuit PXC2 and may be electrically connected to the second drain electrode DE2 of the second transistor M2 of the second pixel circuit PXC2. The third data line DL3 is a data line for the third pixel circuit PXC3 and may be electrically connected to the second drain electrode DE2 of the second transistor M2 of the third pixel circuit PXC3.

A sensing line SENL may extend in the second direction DR2. The sensing line SENL may be electrically connected to the third drain electrode DE3 of the third transistor M3 of each of the first to third pixel circuits PXC1, PXC2, and PXC3. The sensing line SENL may be formed by the lower auxiliary electrode layer BML.

A first power line PL1 may include a (1_1)th power line PL1_H extending in the first direction DR1 and a (1_2)th power line PL1_V extending in the second direction DR2. The (1_1)th power line PL1_H and the (1_2)th power line PL1_V may be electrically connected to each other through one contact hole (e.g., one contact opening). Accordingly, the first power line PL1 may be formed in a mesh structure, to be electrically connected to the first drain electrode DE1 of the first transistor M1 of each of the first to third pixel circuits PXC1, PXC2, and PXC3.

In accordance with an embodiment, the (1_2)th power line PL1_V may overlap one of the sub-pixel areas SPXA. For example, the (1_2)th power line PL1_V may extend through the first sub-pixel area SPXA1 in the second direction DR2. In some embodiments, at least a portion of the (1_2)th power line PL1_V may be disposed between the first areas A1 of the first sub-pixel SPX1.

In accordance with an embodiment, a portion of the lower auxiliary electrode layer BML, which is connected to the first source electrode SE1 of the first transistor M1, may be electrically connected to a first connection electrode CNE1 through a first contact part CNT1. Accordingly, an anode signal for driving the light emitting elements LD to emit light may be supplied to the first connection electrode CNE1. A first adjacent contact CNT1' may refer to a first contact part CNT1 of another pixel PXL adjacent to the pixel PXL as shown in the figures.

A second power line PL2 may include a (2_1)th power line PL2_H extending in the first direction DR1 and a (2_2)th power line PL2_V extending in the second direction DR2. The (2_1)th power line PL2_H and the (2_2)th power line PL2_V may be electrically connected to each other through one contact hole (e.g., one contact opening). Accordingly, the second power line PL2 may be formed in a mesh structure to be electrically connected to the second electrode ELT2 (e.g., the second alignment electrode ELTG) (or to the second connection electrode CNE2). For example, the second power line PL2 may supply a low-potential pixel power VSS to the second electrode ELT2 through a second contact member CNP2. The second power line PL2 may supply the low-potential pixel power VSS to the second connection electrode CNE2 through a second contact part CNT2. Accordingly, a cathode signal for driving the light emitting elements LD to emit light may be supplied to the second connection electrode CNE2.

In accordance with an embodiment, the (2_2)th power line PL2_V may overlap one of the sub-pixel areas SPXA. For example, the (2_2)th power line PL2_V may extend through the second sub-pixel area SPXA2 in the second direction DR2. In some embodiments, the (2_2)th power line PL2_V may be disposed between the first areas A1 of the second sub-pixel SPX2.

Referring to FIGS. 11 and 12, light emitting elements LD may be aligned on alignment electrodes ELT to correspond to first areas A1.

Light emitting elements LD may be aligned between a first alignment electrode ELTA and a second alignment electrode ELTG, and each of the light emitting elements LD may be disposed to overlap a first area A1. For example, a first electrode ELT1, which may act as a first alignment electrode ELTA, and a second electrode ELT2 and a third electrode ELT3, which may each act as second alignment electrodes ELTG, may be disposed in each of the sub-pixels SPX. The first to third electrodes ELT1, ELT2, and ELT3 may be spaced apart from each other in the first direction DR1 and may extend in the second direction DR2. Accordingly, light emitting elements LD may be disposed between the first electrode ELT1 and the second electrode ELT2, and an area in which the light emitting elements LD are disposed may correspond to a first area A1. Light emitting elements LD may be disposed between the second electrode ELT2 and the third electrode ELT3, and an area in which the light emitting elements LD are disposed may correspond to a first area A1.

The first electrode ELT1 may be electrically connected to the first power line PL1 (e.g., the (1_1)th power line PL1_H) through a first contact member CNP1 to be supplied with a first alignment signal. The second electrode ELT2 and the third electrode ELT3 may be electrically connected to the second power line PL2 (e.g., the (2_1)th power line PL2_H) through second contact members CNP2 to be supplied with a second alignment signal. As described above, the light emitting elements LD may be aligned based on an electric field according to the first alignment signal and the second alignment signal.

Referring to FIGS. 11 and 13, light emitting elements LD may be disposed on a first area A1 to be electrically connected to each other between an anode connection electrode AE and a cathode connection electrode CE.

The light emitting elements LD may be supplied with an anode signal through the anode connection electrode AE, which can be supplied with the anode signal through a first contact part CNT1, and may be supplied with a cathode signal through the cathode connection electrode CE, which can be supplied with the cathode signal through a second contact part CNT2. In some embodiments, the light emitting elements LD may be electrically connected to a connection electrode layer CNE in various suitable manners. For example, each of first areas A1 formed in each of the sub-pixels SPX may form a serial part (e.g., a light emitting unit EMU) of light emitting elements LD. For convenience of description, an embodiment in which four serial parts are formed in each of the sub-pixels SPX will be primarily described below. However, the present disclosure is not necessarily limited thereto.

In accordance with an embodiment, the connection electrode layer CNE may include an anode connection electrode AE, a middle connection electrode ME, and a cathode connection electrode CE. The middle connection electrode ME may include a first middle connection electrode ME1, a second middle connection electrode ME2, and a third middle connection electrode ME3. In each of the sub-pixels SPX, light emitting elements LD corresponding to a first area A1 of a first serial part (e.g., a left upper area) may be electrically connected to each other between the anode connection electrode AE and the first middle connection electrode ME1. In addition, light emitting elements LD corresponding to a first area A1 of a second serial part (e.g., a left lower area) may be electrically connected to each other between the first middle connection electrode ME1 and the second middle connection electrode ME2. In addition, light emitting elements LD corresponding to a first area of a third serial part (e.g., a right lower area) may be electrically connected between the second middle connection electrode ME2 and the third middle connection electrode ME3. In addition, light emitting elements LD corresponding to a first area A1 of a fourth serial part (e.g., a right upper area) may be electrically connected to each other between the third middle connection electrode ME3 and the cathode connection electrode CE. Accordingly, the light emitting elements LD in each of the sub-pixels SPX can be configured to emit light in at least two first areas A1.

Next, various examples of a structure of electrodes for forming a sub-pixel SPX in accordance with embodiments of the present disclosure will be described with reference to FIGS. 14 to 17. In FIGS. 14 to 17, descriptions of portions that are the same or substantially similar to the above-described portions will be simplified or will not be repeated.

Figure 14:
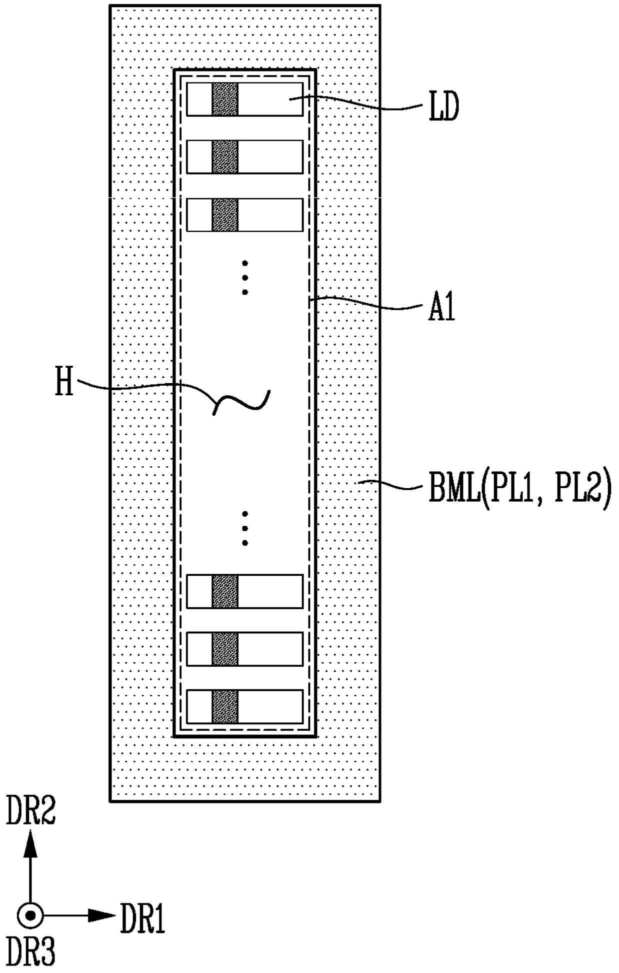
FIG. 14 is a schematic plan view illustrating a first area and an area adjacent to the first area in accordance with an embodiment of the present disclosure.
Figure 15:
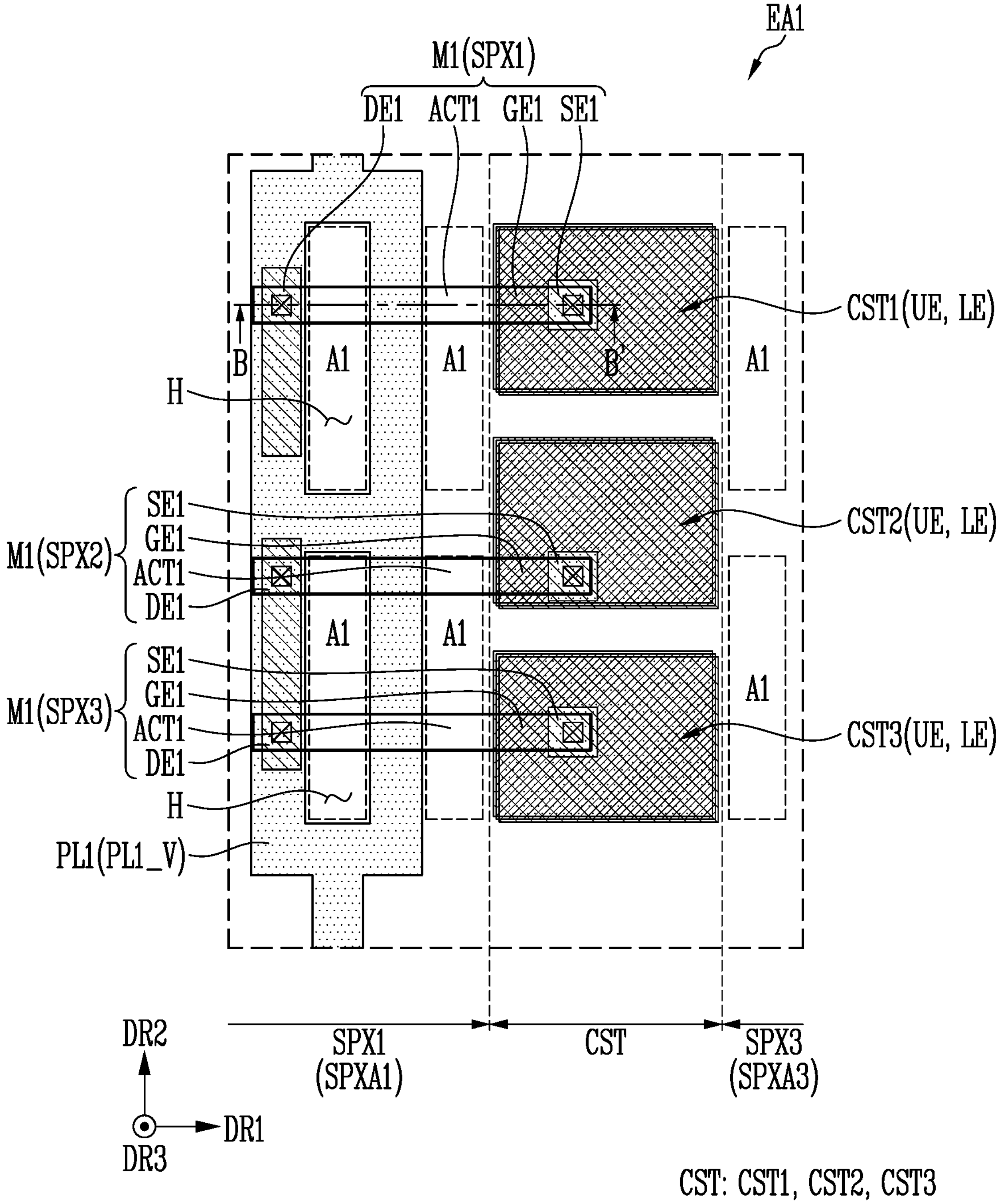
FIG. 15 is a schematic enlarged view of the area EA1 in FIG. 11.
Figure 16:
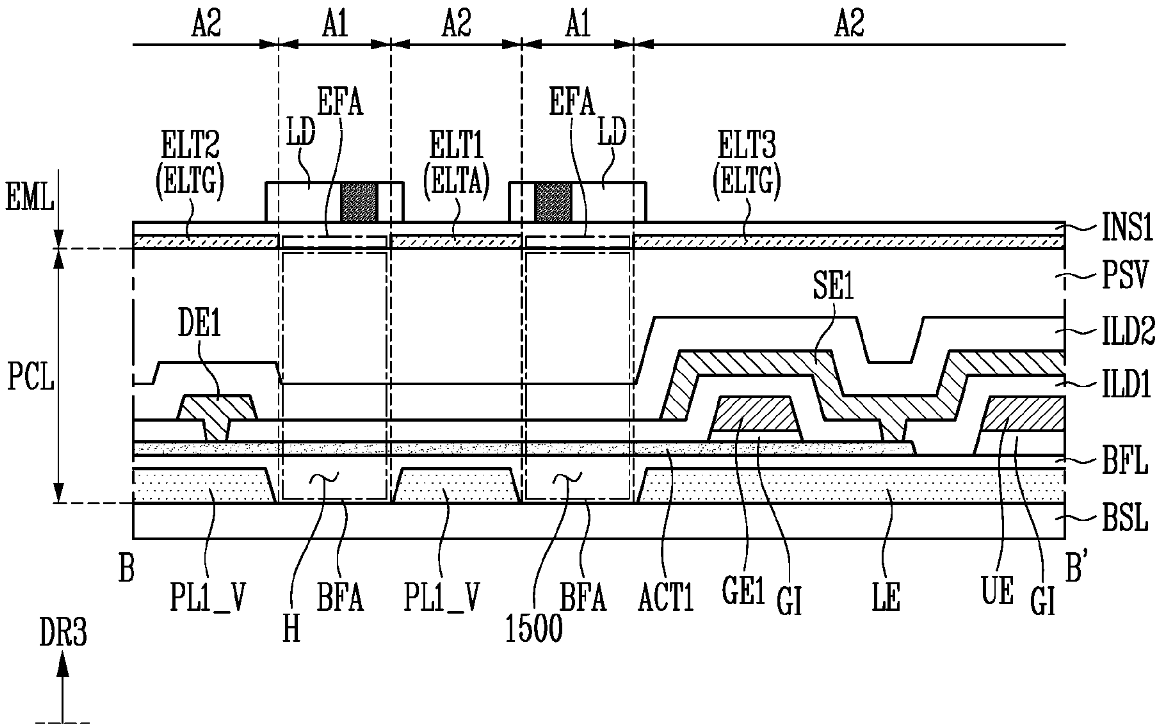
FIG. 16 is a schematic sectional view taken along the line B-B' in FIG. 15.
Figure 17:
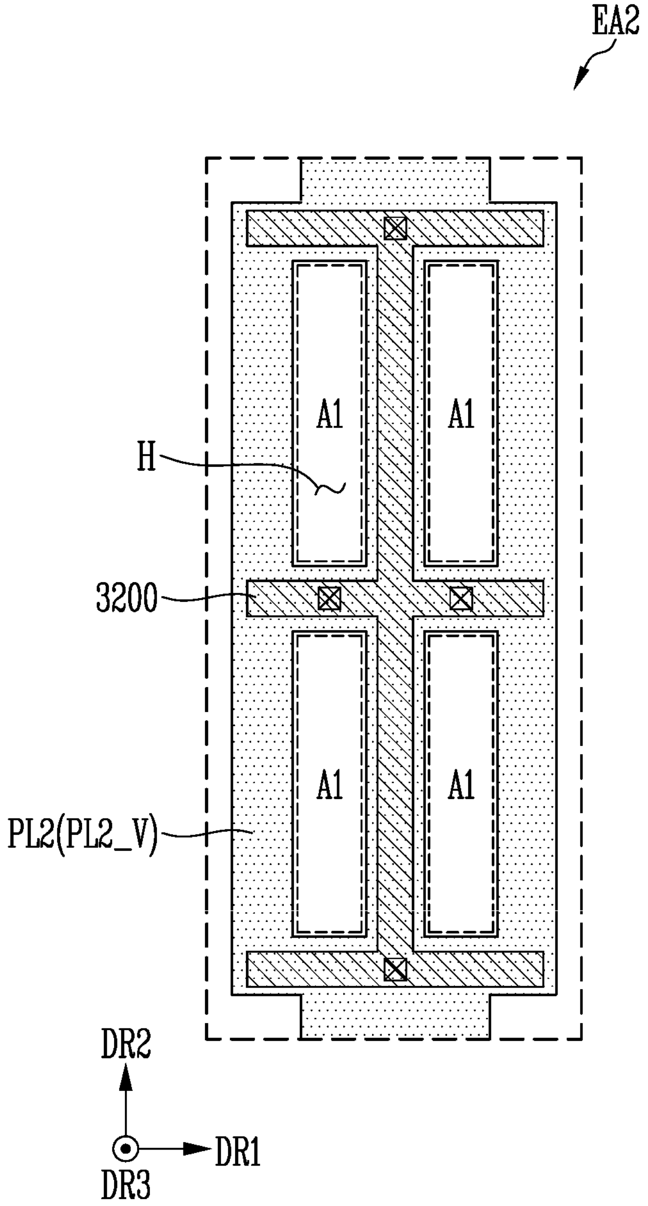
FIG. 17 is a schematic enlarged view of the area EA2 in FIG. 11.

FIG. 14 is a schematic plan view illustrating a first area and an area adjacent to the first area in accordance with an embodiment of the present disclosure. FIG. 14 may be a schematic plan view illustrating a structural feature between the first and second power lines PL1 and PL2 and between light emitting elements LD and a first area A1 in accordance with an embodiment of the present disclosure. FIG. 15 is a schematic enlarged view of the area EA1 in FIG. 11. FIG. 15 may be a schematic plan view illustrating a structural feature between the (1_2)th power line PL1_V and areas adjacent thereto. FIG. 16 is a schematic sectional view taken along the line B-B' in FIG. 15. FIG. 17 is a schematic enlarged view of the area EA2 in FIG. 11. FIG. 17 may be a schematic plan view illustrating a structural feature between the (2_2)th power line PL2_V and areas adjacent thereto.

Referring to FIGS. 14 to 17, the first power line PL1 and the second power line PL2 may be formed by the lower auxiliary electrode layer BML and may form a hole area (e.g., an open area) H surrounding at least a portion of a first area A1. In some embodiments, a hole area H formed by the first power line PL1 may be referred to as a first hole area, and a hole area H formed by the second power line PL2 may be referred to as a second hole area.

For example, the (1_2)th power line PL1_V generally extends in the second direction DR2 but may not be patterned in a partial area. The (1_2)th power line PL1_V may surround at least a portion of a first area A1 in which light emitting elements LD are disposed. Accordingly, a hole area H may overlap a first area A1 in a plan view.

Similarly, the (2_2)th power line PL2_V generally extends in the second direction DR2 but may not be patterned in a partial area. The (2_2)th power line PL2_V may surround at least a portion of a first area A1 in which light emitting elements LD are disposed. Accordingly, a hole area H may overlap a first area A1 in a plan view.

In accordance with an embodiment, the hole area H defined by each of the first power line PL1 and the second power line PL2 may overlap the line-free area BFA in which the lower lines BPL are not formed in a plan view. For example, the line-free area BFA may be defined by the structure in which the hole area H of each of the first power line PL1 and the second power line PL2 is formed, and the first area A1 and the line-free area BFA may be defined at where light emitting elements LD can be aligned to a high alignment degree.

In accordance with an embodiment, the first power line PL1 forming the hole area H may be disposed at a side of storage capacitors CST. First areas A1 corresponding to the hole area H, other first areas A1 not corresponding to the hole area H, and the storage capacitors CST may be sequentially disposed in the first direction DR1. For example, an electrode-free area EFA between the first electrode ELT1 and the second electrode ELT2 may overlap the hole area H, and light emitting elements LD may be disposed on the first electrode ELT1 and the second electrode ELT2. In addition, an electrode-free area EFA between the first electrode ELT1 and the third electrode ELT3 may overlap an area 1500 between the (1_2)th power line PL1_V and a lower electrode LE as another auxiliary electrode layer BML, and light emitting elements LD may be disposed on the first electrode ELT1 and the third electrode ELT3. In addition, at least two lower lines BPL formed in the pixel circuit layer PCL do not overlap the electrode-free area EFA. Accordingly, a structure can be implemented in which the first areas A1 do not overlap the lower lines BPL while first to third storage capacitors CST1, CST2, and CST3 are collectively disposed in one area.

Referring to FIG. 17, an overlapping conductive layer 3200 may be formed on the (2_2)th power line PL2_V. The overlapping conductive layer 3200 may be formed upwardly of (e.g., may be formed on) the lower auxiliary electrode layer BML. For example, the overlapping conductive layer 3200 may be electrically connected to the (2_2)th power line PL2_V through one contact hole (e.g., one contact opening). The overlapping conductive layer 3200 may be disposed adjacent to first areas A1. For example, a portion of the overlapping conductive layer 3200 may be disposed between the first areas A1 adjacent to each other, and another portion of the overlapping conductive layer 3200 may be disposed adjacent to the first areas A1 at outer portions of the first areas A1.

The overlapping conductive layer 3200 may allow lower lines BPL to have a sufficient thickness at a position adjacent to a first area A1 in which light emitting elements LD are disposed. For example, when lower lines BPL have different structures (e.g., total formed thicknesses, numbers, or the like) in an area adjacent to a first area A1 formed in each of the sub-pixels SPX, the different structures of the lower lines BPL may influence the alignment degree of light emitting elements LD. An electric field for aligning light emitting elements LD in each of the sub-pixels SPX may be influenced by the different structures of the lower lines BPL, and a deviation may occur in an alignment aspect of light emitting elements LD in each of the sub-pixels SPX. However, in accordance with an embodiment, the overlapping conductive layer 3200 may be patterned adjacent to a first area A1 of one sub-pixel SPX, and accordingly, the alignment degree of light emitting elements LD can be consistently maintained.

Figure 18:
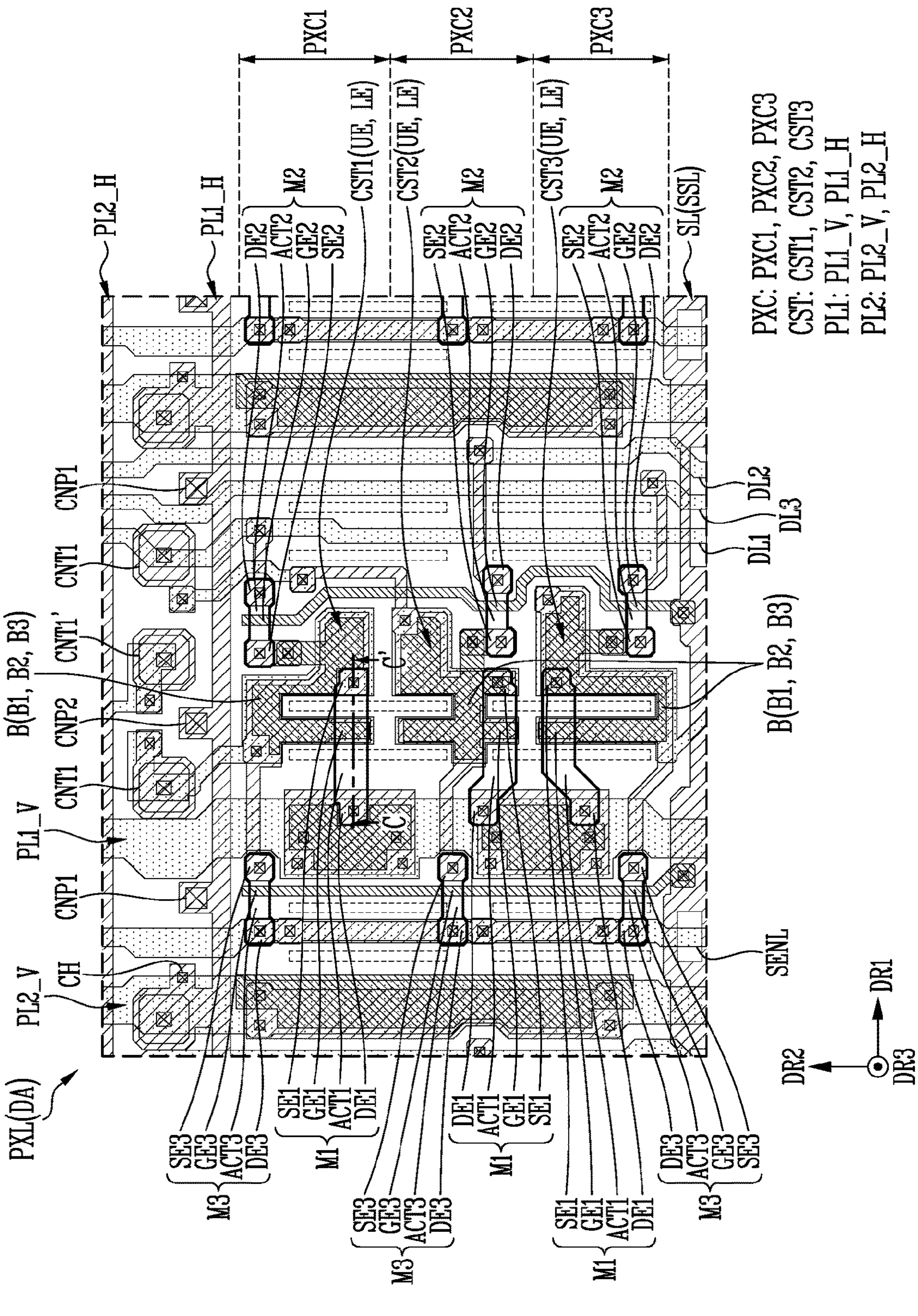
FIGS. 18 and 19 are schematic plan and cross-sectional views, respectively, illustrating an electrode structure in accordance with an embodiment of the present disclosure.
Figure 19:
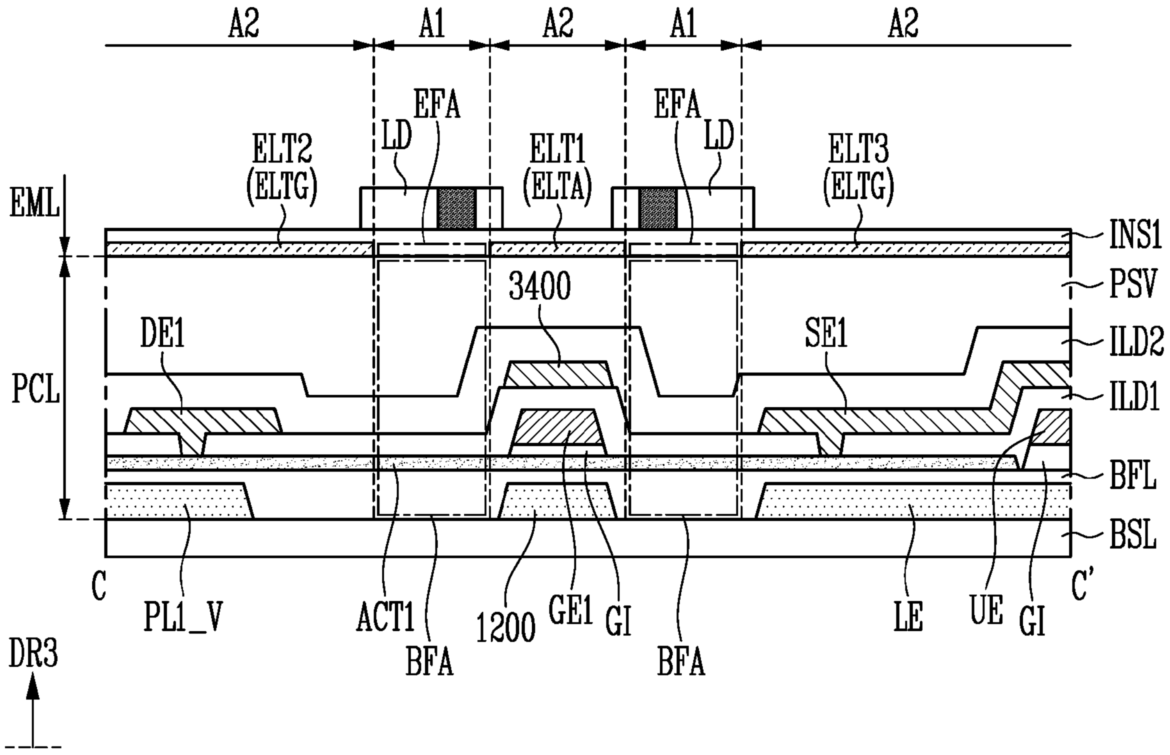

Next, a structure of electrodes of the display device 100 in accordance with another embodiment of the present disclosure will be described with reference to FIGS. 18 and 19. FIGS. 18 and 19 are views illustrating a structure of sub-pixels in accordance with another embodiment of the present disclosure. In FIGS. 18 and 19, descriptions of portions that are the same or substantially similar to the above-described portions will be simplified or will not be repeated.

FIGS. 18 and 19 are schematic views illustrating an electrode structure in accordance with an embodiment of the present disclosure. FIG. 18 may be a schematic view illustrating a planar structure of electrodes based on the electrode patterns described above with reference to FIG. 5. FIG. 18 may be a view primarily illustrating a structure of lower line BPL. FIG. 19 is a schematic cross-sectional view taken along the line C-C' in FIG. 18.

Referring to FIGS. 18 to 19, the structure of a sub-pixel SPX in accordance with another embodiment of the present disclosure is different from the structure in accordance with the embodiment of the present disclosure described above in that some of lower lines BPL extending in an area in which a storage capacitor CST is formed are disposed between first areas A1 adjacent to each other in the first direction DR1.

In accordance with an embodiment, first areas A1 may be adjacent to each other in the first direction DR1, and at least one of lower lines BPL may be patterned between the first areas A1. For example, a first gate electrode GE1 of a first transistor M1 may be disposed between the first areas A1. In addition, an upper overlapping conductive layer 3400 may be disposed between the first areas A1. In addition, a first lower auxiliary electrode layer 1200 may be disposed between the first areas A1. Accordingly, in a second area A2 between the first areas A1 adjacent to each other in the first direction DR1, the first lower auxiliary electrode layer 1200, the first gate electrode GE1, and the upper overlapping conductive layer 3400 may overlap each other on a plane.

In accordance with an embodiment, the lower lines BPL disposed between the first areas A1 may be electrically connected to storage capacitors CST and a portion of the second interlayer conductive layer ICL2 through bridge lines B. In some embodiments, the bridge lines B may include a first bridge line B1 formed by the lower auxiliary electrode layer BML, a second bridge line B2 formed by the first interlayer conductive layer ICL1, and a third bridge line B3 formed by the second interlayer conductive layer ICL2.

For example, the first lower auxiliary electrode layer 1200 between the first areas A1 may be electrically connected to a lower electrode LE of a storage capacitor CST through the first bridge line B1. The first gate electrode GE1 between the first areas A1 may be electrically connected to an upper electrode UE of the storage capacitor CST through the second bridge line B2. The upper overlapping conductive layer 3400 between the first areas A1 may be electrically connected to a portion (e.g., a first source electrode SE1 or the like) of the second interlayer conductive layer ICL2, which overlaps the storage capacitor CST, through the third bridge line B3.

In accordance with an embodiment, the lower lines BPL may not overlap an electrode-free area EFA in which an electric field for aligning light emitting elements LD is formed, thereby securing an alignment degree of the light emitting elements LD. At the same time, some of the lower lines BPL overlapping the storage capacitor CST are formed between the first areas A1, thereby forming a relatively fine electrode pattern structure. Accordingly, the display device 100, in accordance with an embodiment of the present disclosure, can have a high resolution, and a uniform (or intended) number of light emitting elements LD can be formed in sub-pixels SPX.

In accordance with embodiments of the present disclosure, a display device exhibiting an improved alignment degree of light emitting elements is provided.

In accordance with embodiments of the present disclosure, a display device that sufficiently ensures performance of pixel circuits is provided.

Example embodiments have been disclosed herein, and although specific terms are employed, they are used and are to be interpreted in a generic and descriptive sense and not for purpose of limitation. In some instances, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims and their equivalents.

What is claimed is:

1. A display device comprising:

a base layer;

a first sub-pixel, a second sub-pixel, and a third sub-pixel;

a pixel circuit layer on the base layer, the pixel circuit layer comprising a first pixel circuit of the first sub-pixel, a second pixel circuit of the second sub-pixel, a third pixel circuit of the third sub-pixel, and lower lines, the pixel circuit layer having a line-free area in which the lower lines are not present; and a light-emitting-element layer on the pixel circuit layer, the light-emitting-element layer comprising electrodes and a plurality of light emitting elements on the electrodes, the light-emitting-element layer having an electrode-free area in which the electrodes are not present, wherein each of the first pixel circuit, the second pixel circuit, and the third pixel circuit comprises a storage capacitor, wherein the storage capacitor comprises a first storage capacitor of the first pixel circuit, a second storage capacitor of the second pixel circuit, and a third storage capacitor of the third pixel circuit, wherein the electrodes comprise a first electrode and a second electrode that are spaced apart from each other in a first direction, wherein the first storage capacitor, the second storage capacitor, and the third storage capacitor are arranged in a second direction different from the first direction, and wherein the line-free area overlaps the electrode-free area in a plan view.

2. The display device of claim 1, wherein the lower lines are not present in a first area, wherein the lower lines are present in a second area, and wherein, in the plan view, the line-free area overlaps the first area but does not overlap the second area.

3. The display device of claim 2, wherein, in the plan view, the electrode-free area overlaps the first area but does not overlap the second area.

4. The display device of claim 2, wherein the lower lines comprises a lower auxiliary electrode layer, a first interlayer conductive layer, and a second interlayer conductive layer, and wherein at least one of the lower auxiliary electrode layer, the first interlayer conductive layer, and the second interlayer conductive layer is in the second area.

5. The display device of claim 2, wherein the first area is provided in plurality, the first areas being adjacent to each other in the first direction, and wherein at least a portion of the lower lines extending from the storage capacitor are between the first areas adjacent to each other in the first direction.

6. The display device of claim 5, wherein the lower lines comprise a lower auxiliary electrode layer on the base layer, a first interlayer conductive layer on the lower auxiliary electrode layer, and a second interlayer conductive layer on the first interlayer conductive layer, wherein each of the first pixel circuit, the second pixel circuit, and the third pixel circuit comprises a driving transistor, wherein the first interlayer conductive layer forms a gate electrode of the driving transistor, and wherein, in the plan view, at least a portion of the lower auxiliary electrode layer, the gate electrode of the driving transistor, and an upper overlapping conductive layer formed by the second interlayer conductive layer overlap each other between the first areas adjacent to each other.

7. The display device of claim 1, wherein the line-free area and the electrode-free area overlap the light emitting elements in the plan view.

8. The display device of claim 1, wherein the first storage capacitor, the second storage capacitor, and the third storage capacitor are adjacent to each other in one area between adjacent ones of the first sub-pixel, the second sub-pixel, and the third sub-pixel in the first direction.

9. The display device of claim 1, wherein the first pixel circuit, the second pixel circuit, and the third pixel circuit comprise a driving transistor and a switching transistor, and wherein a gate electrode of the switching transistor extends through a sub-pixel area of one of the first sub-pixel, the second sub-pixel, and the third sub-pixel in the second direction.

10. The display device of claim 1, further comprising:

a first power line for supplying a first power to the light emitting elements; and a second power line for supplying a second power different from the first power, wherein at least a portion of the first power line extends through a sub-pixel area of one of the first sub-pixel, the second sub-pixel, and the third sub-pixel in the second direction.

11. The display device of claim 10, wherein at least a portion of the second power line extends through a sub-pixel area of another of the first sub-pixel, the second sub-pixel, and the third sub-pixel in the second direction.

12. The display device of claim 1, further comprising:

a first power line for supplying a first power to the light emitting element; and a second power line for supplying a second power different from the first power, wherein the first power line defines a first hole area, and wherein, in the plan view, the first hole area overlaps the line-free area and overlaps the electrode-free area.

13. The display device of claim 12, wherein the second power line defines a second hole area, and wherein, in the plan view, the second hole area overlaps the line-free area and overlaps the electrode-free area.

14. The display device of claim 13, further comprising an overlapping conductive layer adjacent to the second hole area, the overlapping conductive layer overlapping the second power line in the plan view.

15. The display device of claim 1, wherein the light emitting element is aligned between the spaced apart electrodes.

16. The display device of claim 15, wherein the light emitting element comprises a first semiconductor layer, a second semiconductor layer, and an active layer between the first semiconductor layer and the second semiconductor layer, and wherein the active layer overlaps the line-free area in the plan view.

17. The display device of claim 15, further comprising:

an anode connection electrode electrically connected to a first end portion of the light emitting element; and a cathode connection electrode electrically connected to a second end portion of the light emitting element.

18. A display device comprising:

a base layer;

a pixel on the base layer, the pixel comprising sub-pixels, each of the sub-pixels comprising light emitting elements; and a pixel circuit layer on the base layer, the pixel circuit layer comprising lower lines for forming pixel circuits electrically connected to the light emitting elements, wherein the sub-pixel comprises a first sub-pixel, a second sub-pixel, and a third sub-pixel, wherein the pixel circuits comprises a first pixel circuit of the first sub-pixel, a second pixel circuit of the second sub-pixel, and a third pixel circuit of the third sub-pixel, wherein the first pixel circuit comprises a first storage capacitor, the second pixel circuit comprises a second storage capacitor, and the third pixel circuit comprises a third storage capacitor, wherein each of the sub-pixels comprises a first electrode and a second electrode that are spaced apart from each other in a first direction, wherein the light emitting elements are aligned on the first electrode and the second electrode, wherein the first storage capacitor, the second storage capacitor, and the third storage capacitor are arranged in a second direction different from the first direction, and wherein an electrode-free area between the first electrode and the second electrode does not overlap the lower lines in a plan view.

* * * * *